(12) United States Patent
Geisbauer

(10) Patent No.: US 7,918,347 B2
(45) Date of Patent: Apr. 5, 2011

(54) CLEANING APPARATUS

(75) Inventor: Heinz Geisbauer, Pfedelbach (DE)

(73) Assignee: Mahle International GmbH (DE)

( * ) Notice: Subject to any disclaimer, the term of this patent is extended or adjusted under 35 U.S.C. 154(b) by 409 days.

(21) Appl. No.: 12/095,660

(22) PCT Filed: Nov. 30, 2006

(86) PCT No.: PCT/DE2006/002141
§ 371 (c)(1),
(2), (4) Date: May 30, 2008

(87) PCT Pub. No.: WO2007/062643
PCT Pub. Date: Jun. 7, 2007

(65) Prior Publication Data
US 2010/0084324 A1 Apr. 8, 2010

(30) Foreign Application Priority Data
Dec. 2, 2005 (DE) .................. 10 2005 057 591

(51) Int. Cl.
*B01D 29/64* (2006.01)
*B01D 33/06* (2006.01)
*B01D 29/82* (2006.01)
*B01D 29/23* (2006.01)
(52) U.S. Cl. .............. 210/391; 210/393; 210/416.1
(58) Field of Classification Search ............. 210/360.1, 210/380.3, 391, 393, 394, 396, 416.1
See application file for complete search history.

(56) References Cited

U.S. PATENT DOCUMENTS

| 3,938,434 A | 2/1976 | Cox |
| 5,160,428 A * | 11/1992 | Kuri ............................ 210/107 |
| 6,543,624 B1 * | 4/2003 | Geisbauer .................... 210/411 |

FOREIGN PATENT DOCUMENTS

| DE | 1461453 | 8/1969 |
| DE | 1536941 | 3/1970 |
| DE | 19514596 | 10/1996 |
| EP | 0207340 | 1/1987 |
| EP | 0531747 | 3/1993 |
| GB | 2390986 | 3/2006 |
| JP | 2004-121955 A * | 4/2004 |
| WO | WO-01/37965 | 5/2001 |

OTHER PUBLICATIONS

English Abstract for DE 19514596.
English Abstract for EP 0207340.

* cited by examiner

*Primary Examiner* — Fred Prince
(74) *Attorney, Agent, or Firm* — Rader, Fishman & Grauer PLLC

(57) ABSTRACT

The invention relates to a cleaning apparatus (1) for removing solid matter from a liquid, especially for a coolant-lubricant circuit (35). Said cleaning apparatus (1) comprises a hollow cylindrical filter member (2) that separates a crude chamber (6) from a pure chamber (7), an inlet (8) which is located on the crude side and is connected to the crude chamber (6), an outlet (9) which is located on the pure side and is connected to the pure chamber (7), a backwashing device (10) for backwashing the filter member (2) segment by segment, and a discharge mechanism (12) for removing clean solid matter from the crude chamber (6). In order to make it easier to remove clean solid matter from the crude chamber (6), the filter member (2) surrounds the crude chamber (6) while the pure chamber (7) surrounds the filter member (2), and the discharge mechanism (12) is equipped with a screw conveyor (13) which feeds the clean solid matter to a discharge port (14).

31 Claims, 20 Drawing Sheets

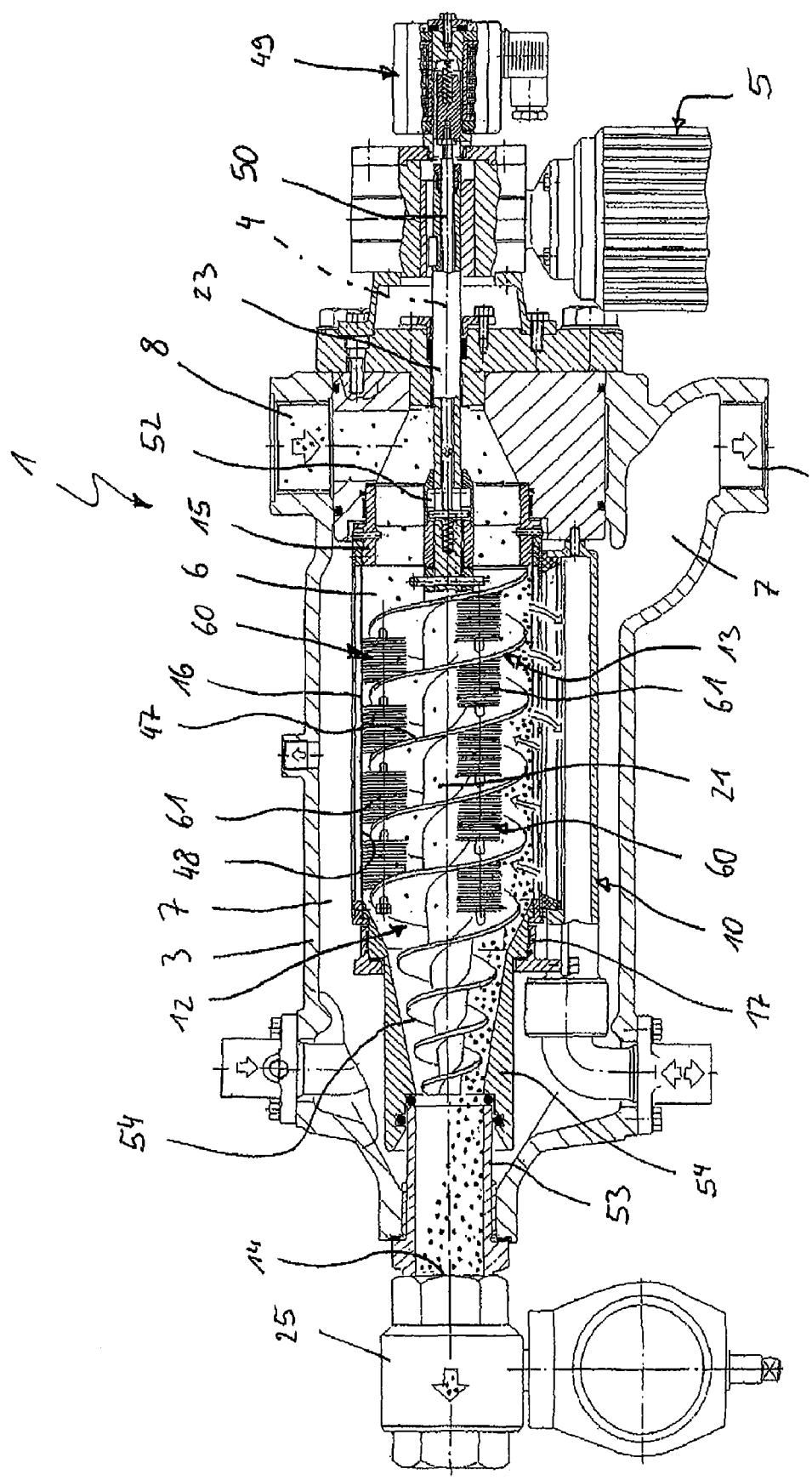

CLEANING APPARATUS

CROSS-REFERENCE TO RELATED APPLICATION

Figure 1:
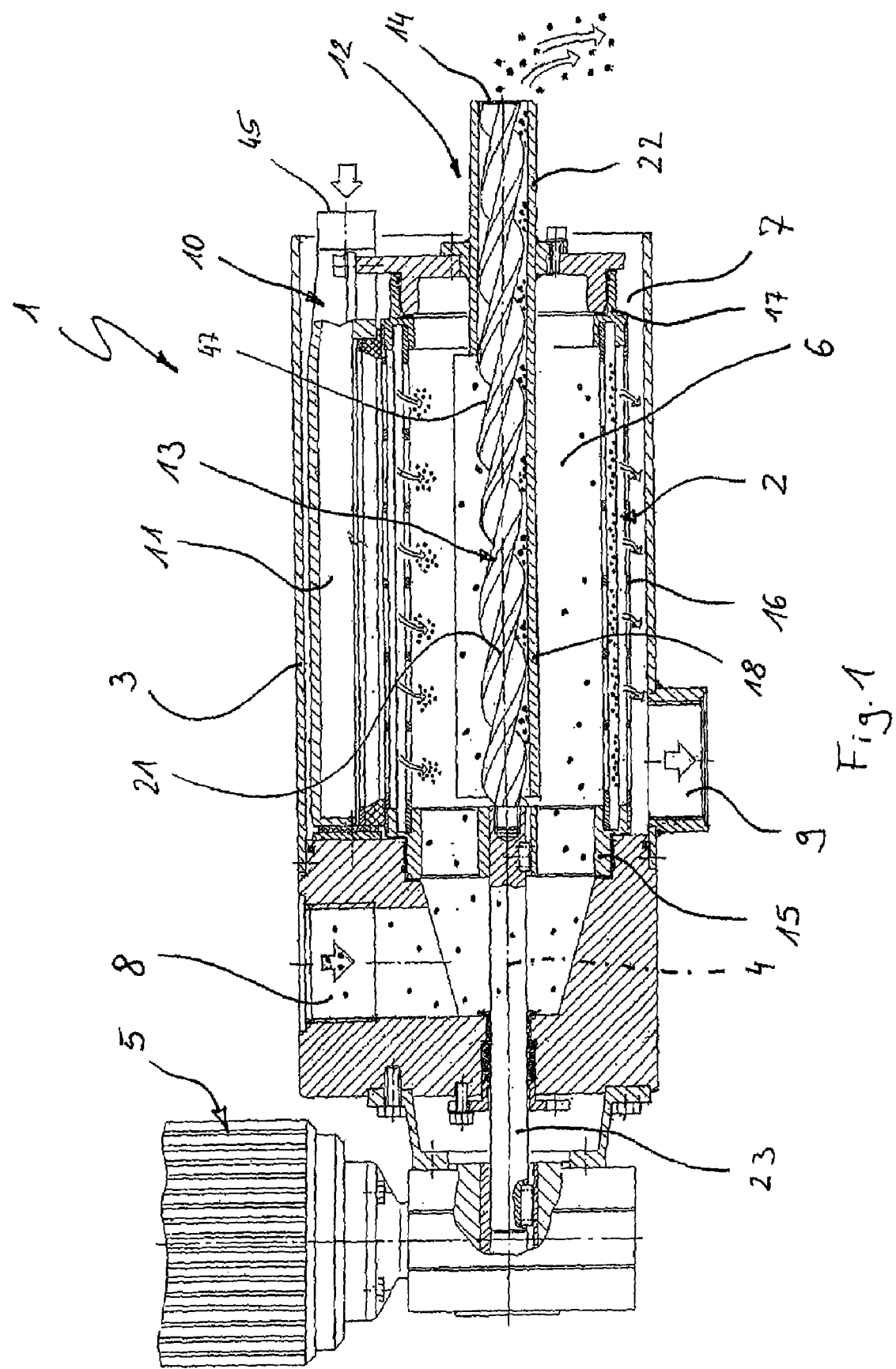

This application is a National Stage application which claims the benefit of International Application No. PCT/DE2006/002141, filed Nov. 30, 2006, which claims priority based on German Patent Application No. DE 10 2005 057 591.9, filed Dec. 2, 2005, both of which are hereby incorporated by reference in their entirety.

The present invention relates to a cleaning apparatus for removing solids from a liquid, in particular for a cooling lubricant circuit, having the features of the preamble of Claim 1. The invention also relates to a cleaning system equipped with at least two such cleaning apparatuses.

DE 102 52 785 A1 describes a cleaning apparatus of the type defined in the introduction, having a hollow cylindrical filter body which separates a crude space from a clean space in a housing. An inlet on the crude end is connected to the crude space while an outlet on the clean end is connected to the clean space. In addition, the cleaning apparatus is equipped with a backwashing device with the help of which the filter body can be backwashed segment by segment. This means that the backwashing device acts upon the filter body on the clean end with a suitable backwashing medium that flows through the filter body in the direction opposite the direction of filtration. In addition, there is a discharge mechanism with the help of which cleaned solids can be removed from the crude space.

With the known cleaning apparatus, the filter body surrounds the clean space and the crude space surrounds the filter body. The filtration device of the filter body is thus oriented from the outside toward the inside. During operation of the cleaning apparatus, impurities are deposited on the crude end of the filter body. The backwashing mechanism rinses off these deposits. With the known cleaning apparatus, the filter body is upright, i.e., arranged with the central longitudinal axis oriented in the direction of gravity. The impurities rinsed with the help of backwashing into the exterior crude space settle out toward the bottom in the crude space due to gravity (unless they are deposited again on the filter body). The housing contains a sump in which the cleaned solids accumulate. The discharge mechanism with the known cleaning apparatus is formed essentially by a discharge opening arranged at the lower end of the housing through which the sump can be drained out of the crude space. Filtration operation must therefore be interrupted briefly because otherwise the contaminated liquid would flow out of the crude space through the discharge opening when the discharge opening is opened.

The present invention relates to the problem of providing a different or improved embodiment of a cleaning apparatus of the type defined in the introduction, such that the removal of the cleaned solids is simplified in particular.

This problem is solved according to this invention by the subject matters of the independent claims. Advantageous embodiments are the subject matter of the dependent claims.

The inventive cleaning apparatus is based on the general idea of designing the filter body, so that its direction of filtration is oriented from the inside to the outside and the cleaned solids are sent with the help of a screw conveyor to a discharge opening. Through the inventive design, it is possible to arrange the filter body so it is horizontal, i.e., essentially with the central longitudinal axis oriented across the direction of gravity, which may be advantageous for many applications. The discharge mechanism equipped with the screw conveyor operates independently of the direction of gravity and therefore may also supply the cleaned solids to the discharge opening when the filter body is arranged horizontally. In addition, the design according to this invention essentially allows the contaminated liquid to be drained out of the crude space before opening the discharge opening, thereby allowing the cleaned solids to be removed in more or less dry form.

The inventive cleaning system is based on the general idea of integrating at least two cleaning apparatuses into a liquid circuit in parallel and, with the help of an inlet valve arrangement, activating and deactivating them in alternation with regard to their filtration operation for convenient and undisturbed cleaning. In this way, the filtration operation of the cleaning system can be continued without interruption even when at least one of the cleaning apparatuses is deactivated temporarily with regard to its filtration operation to remove the cleaned solids. With the filtration operation deactivated, the backwashing may nevertheless be active, which makes the cleaning of the respective cleaning apparatus especially effective.

Other important features and advantages of the invention are derived from the subclaims, the drawings and the respective description of the figures on the basis of the drawings.

It is self-evident that the features mentioned above and those yet to be explained below may be used not only in the particular combination given here but also in other combinations or alone without going beyond the scope of the present invention.

Preferred exemplary embodiments of the invention are depicted in the drawings and explained in greater detail in the following description, where the same reference numerals refer to the same or similar or functionally identical parts.

Figure 3:
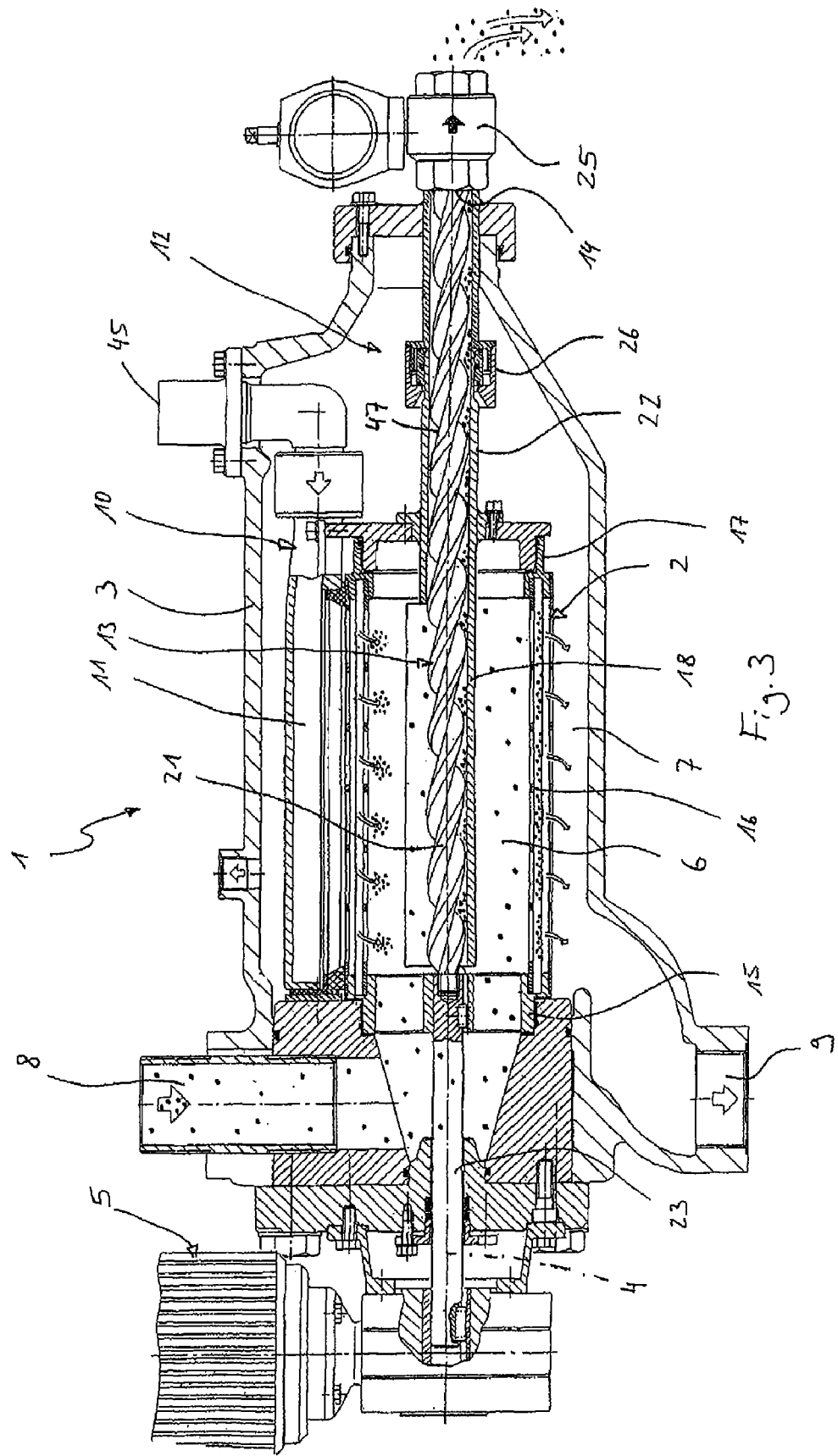
Figure 4:
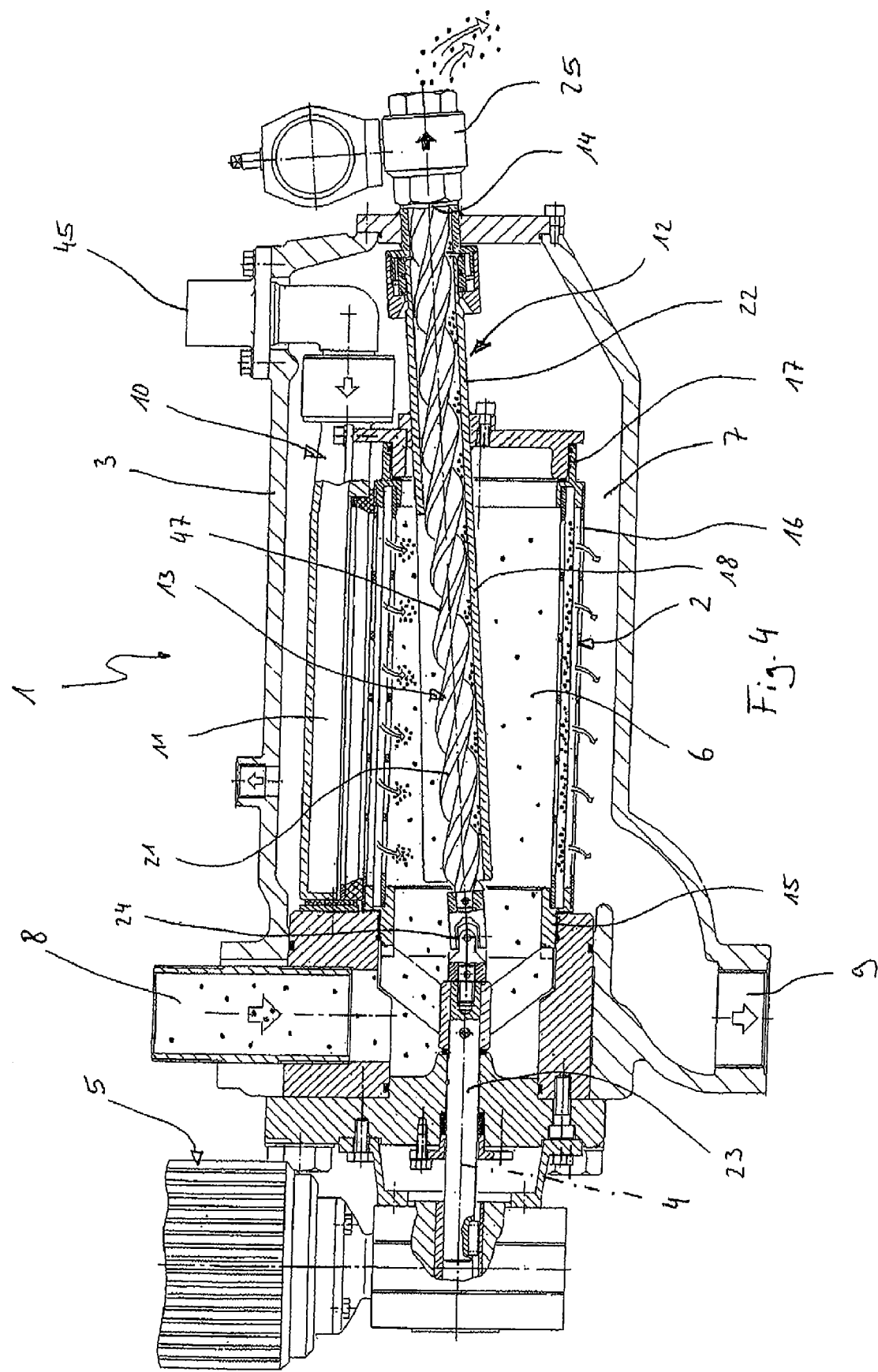
Figure 5:
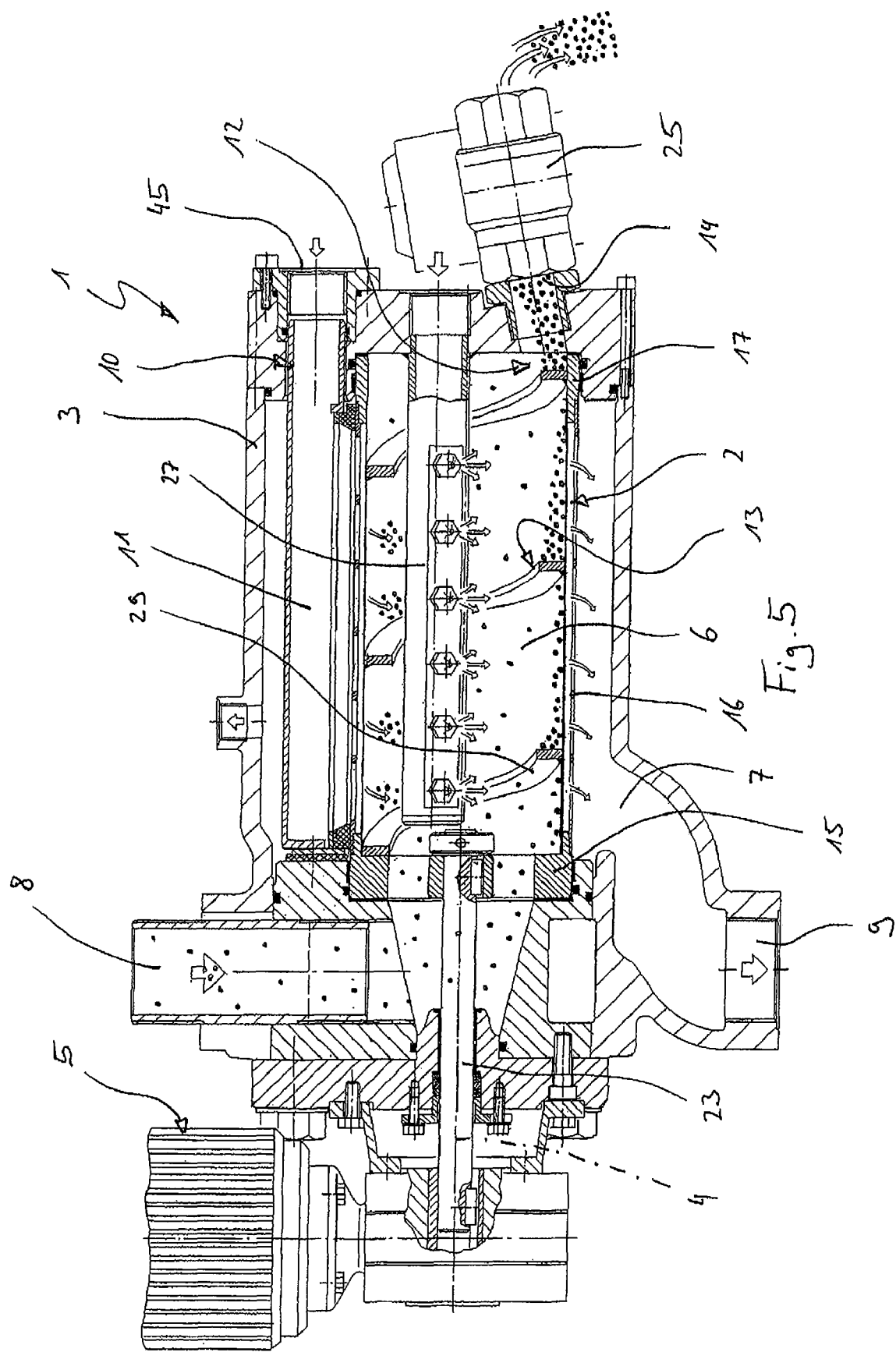
Figure 12:
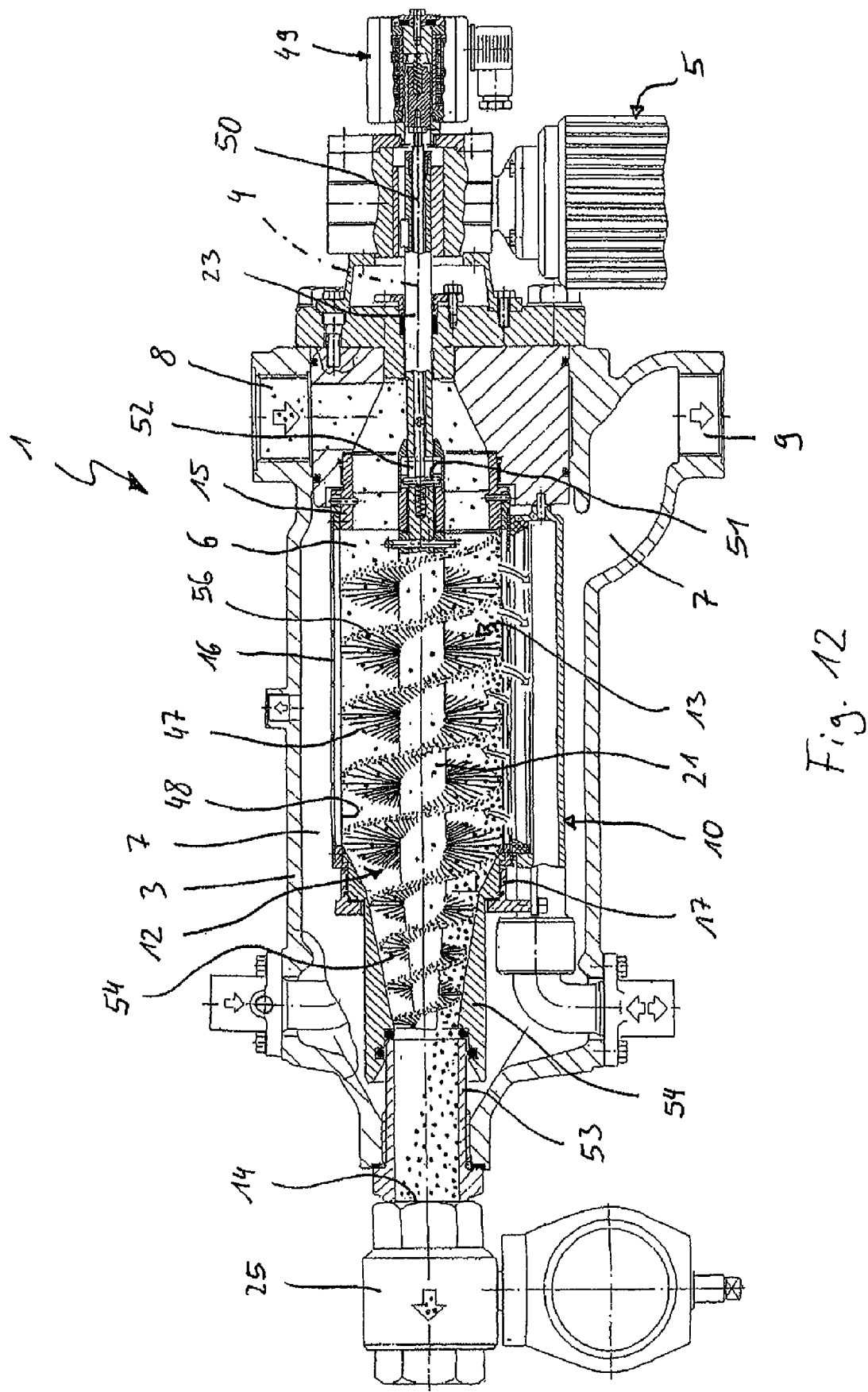
Figure 13:
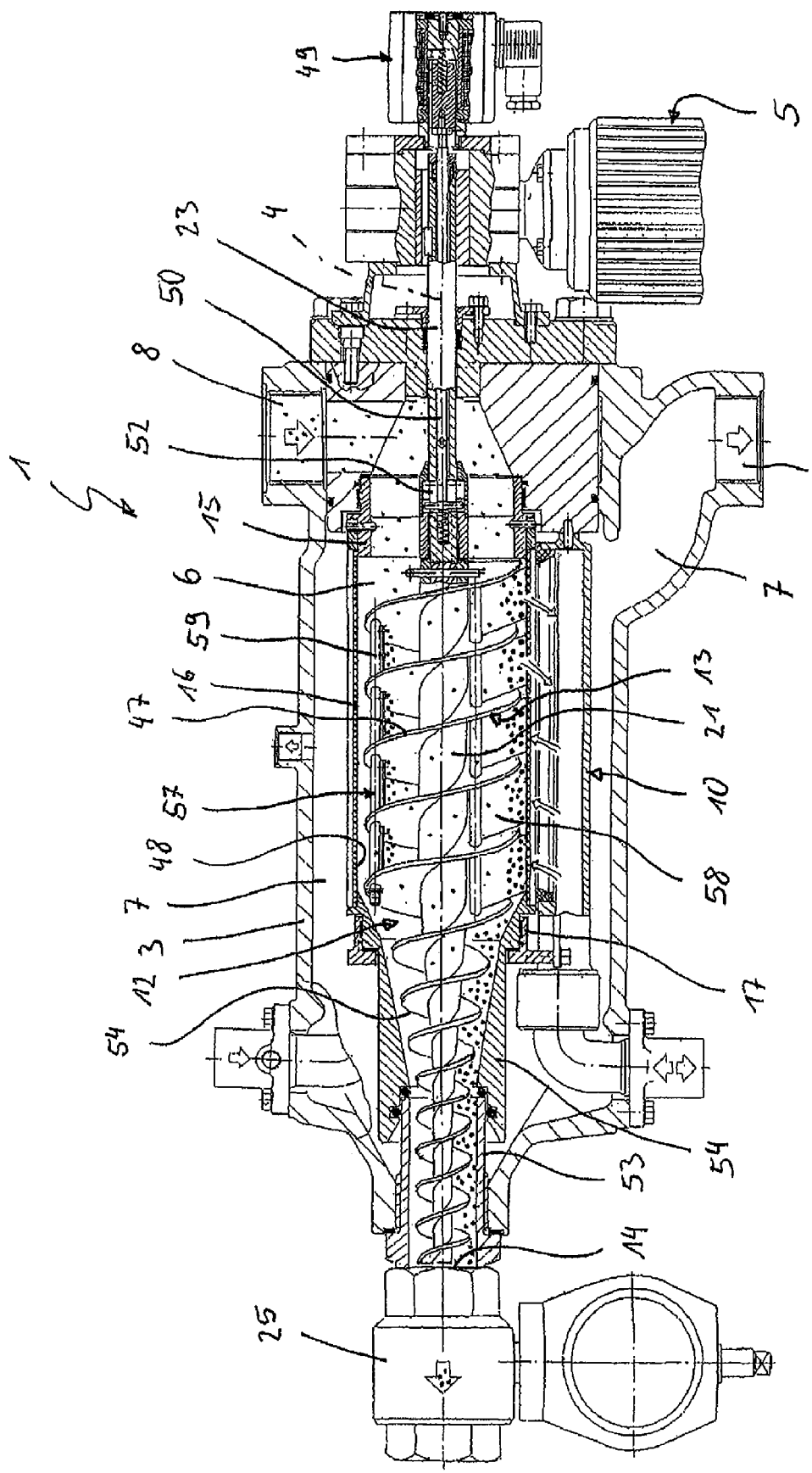
Figure 16:
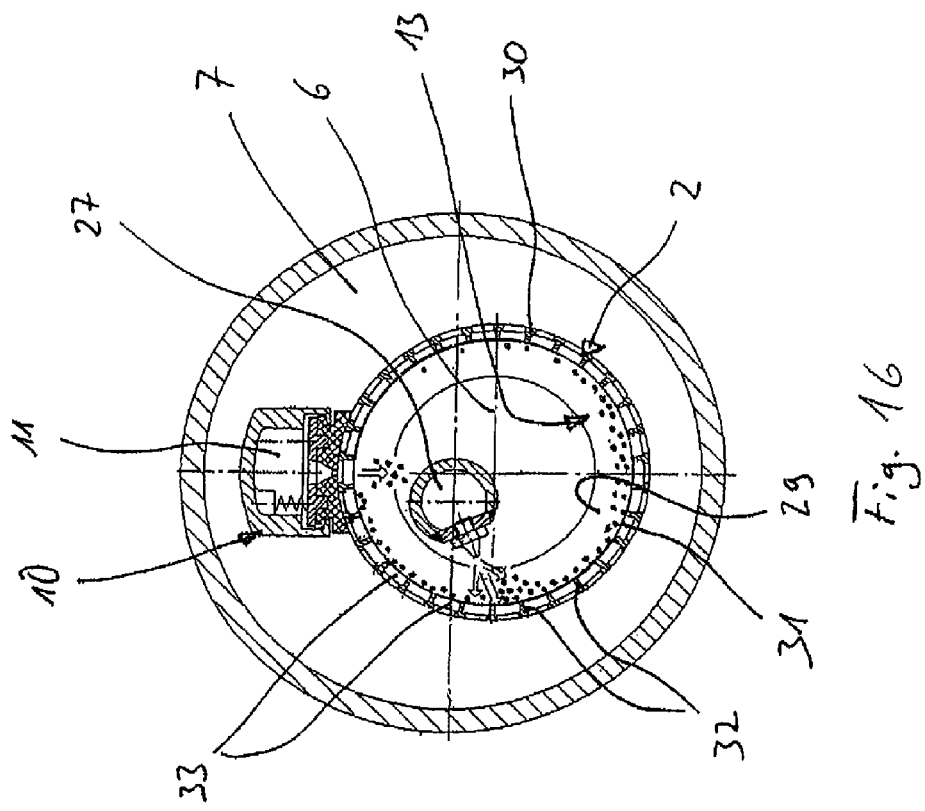
Figure 15:
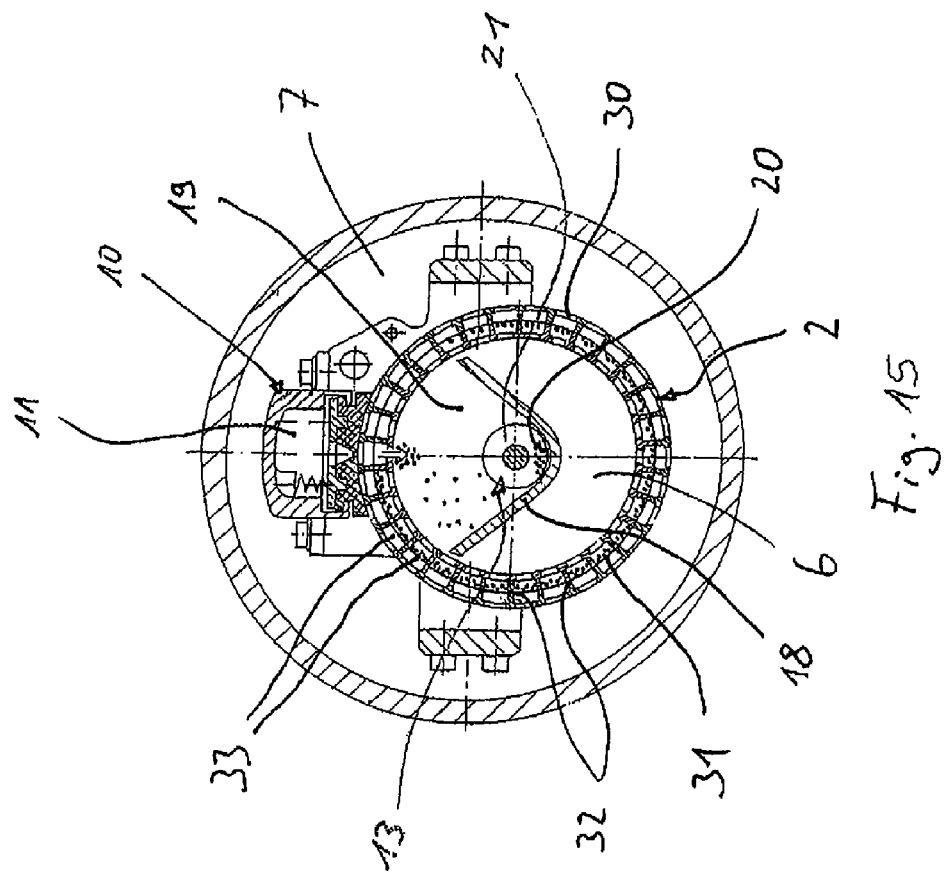
Figure 18:
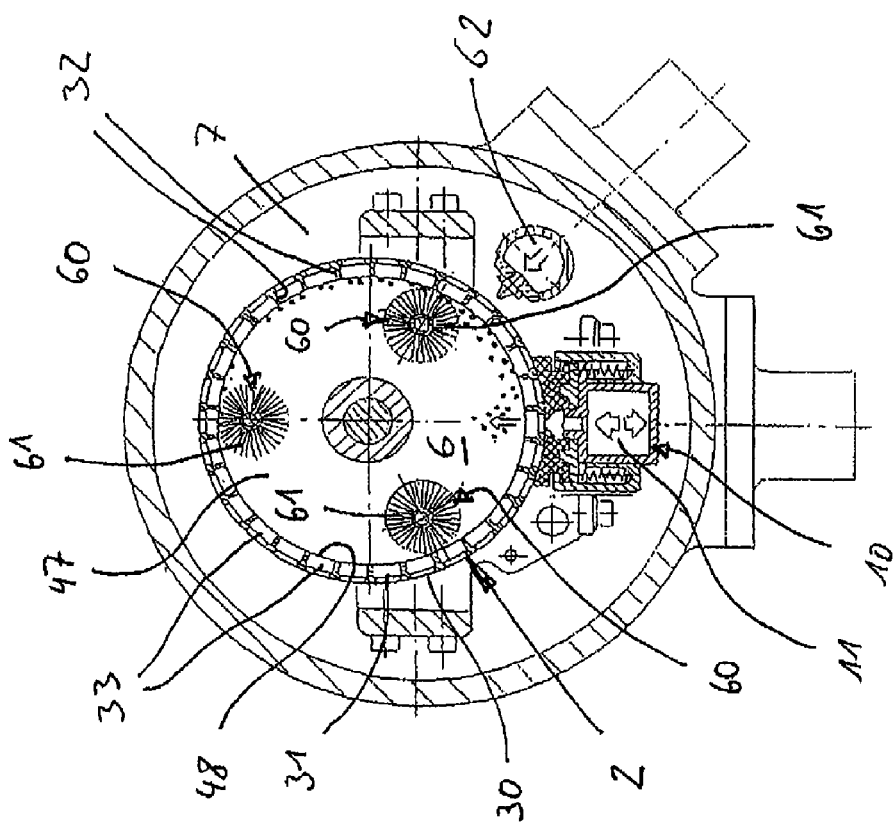
Figure 17:
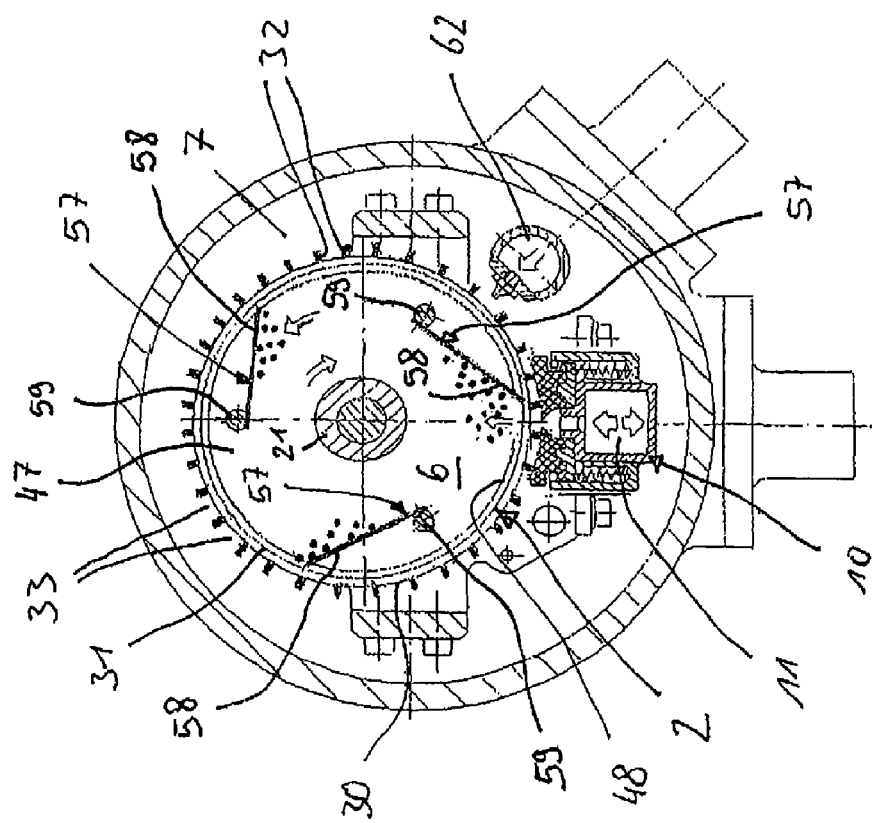
Figure 24:
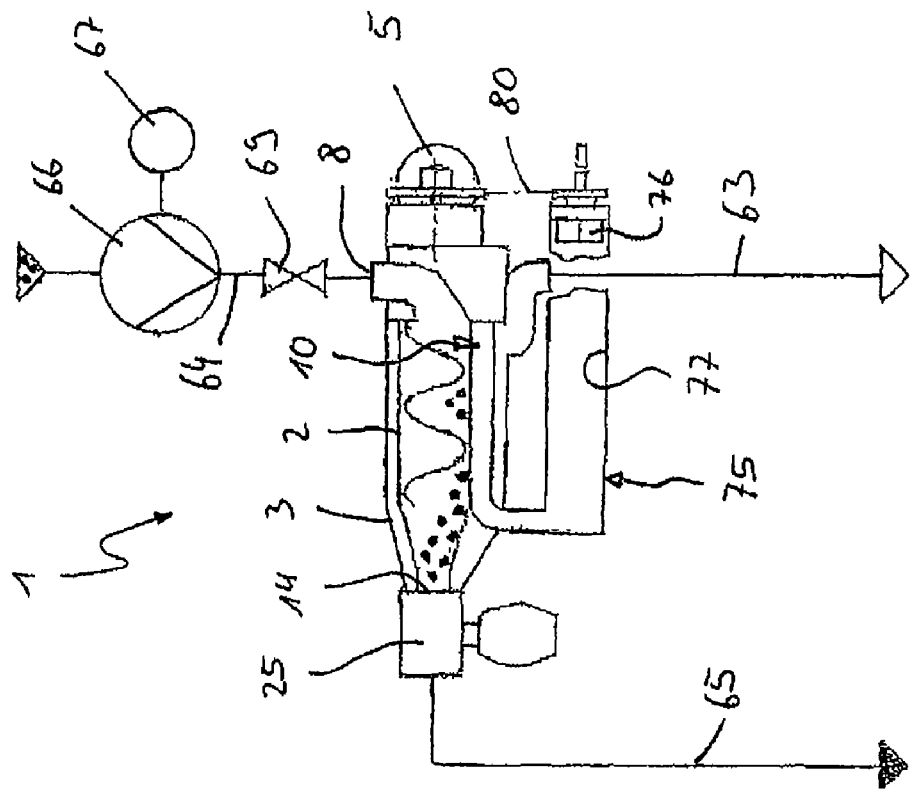
Figure 25:
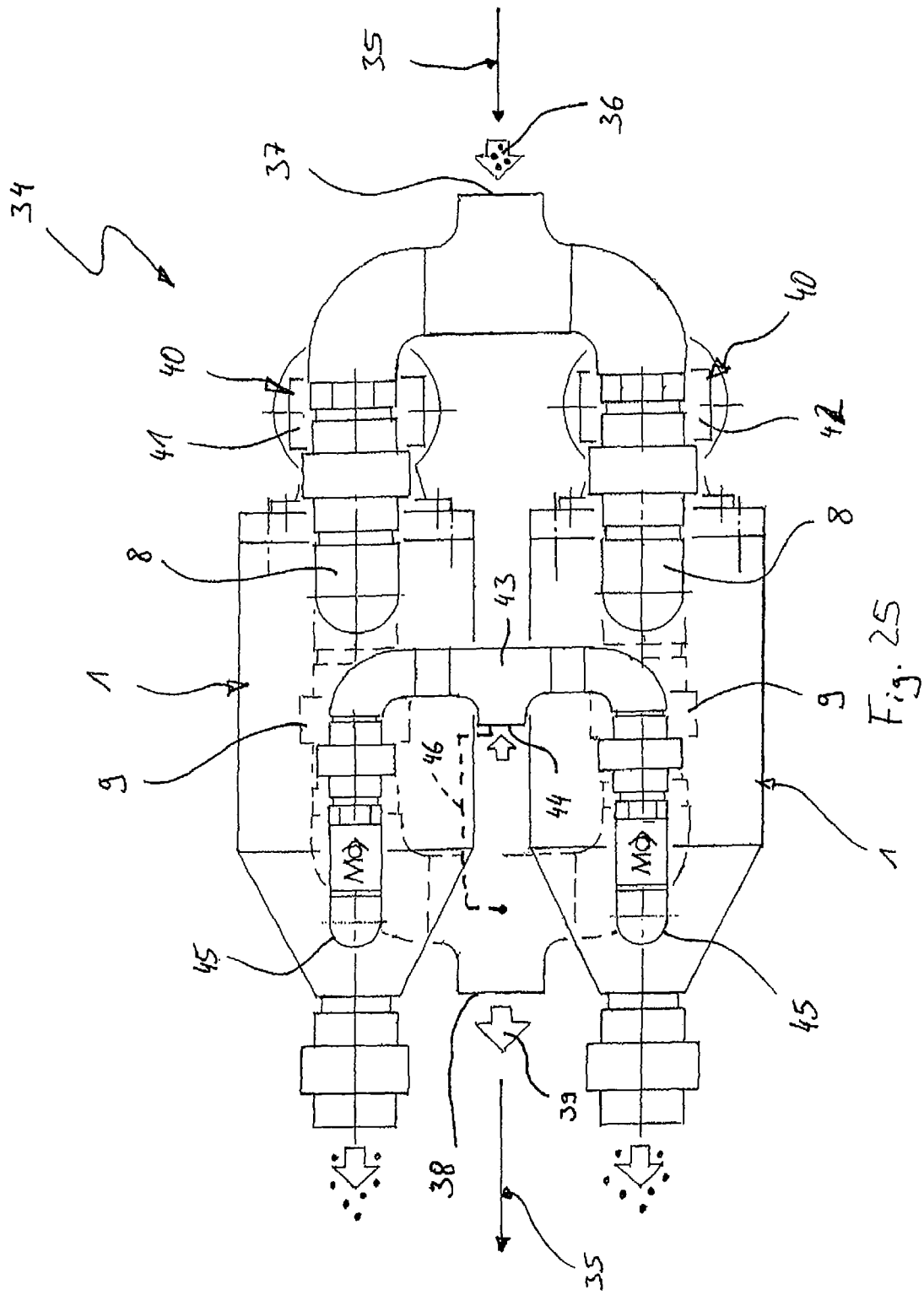

They each show schematically:

FIGS. 1 through 14 each show a simplified longitudinal section through a cleaning apparatus according to this invention, but in different embodiments, FIG. 15 shows a cross section through the cleaning apparatus according to the embodiments in FIGS. 1 through 4, FIG. 16 shows a cross section through the cleaning apparatus according to the embodiment as shown in FIG. 5, FIG. 17 shows a cross section through the cleaning apparatus according to the embodiment as shown in FIG. 13, FIG. 18 shows a cross section through the cleaning apparatus according to the embodiment as shown in FIG. 14, FIGS. 19 through 24 show greatly simplified schematic diagrams resembling wiring diagrams of the cleaning apparatus in various embodiments, FIG. 25 shows a top view of a cleaning system according to this invention.

According to FIGS. 1 through 7, an inventive cleaning apparatus 1 comprises a hollow cylindrical filter body 2. This filter body 2 is mounted in a housing 3 to rotate about its central longitudinal axis 4. A drive unit 5 comprising an electric motor, for example, is provided to drive the filter body 2.

The filter body 2 separates a crude space 6 from a clean space 7 in a housing 3. In the inventive cleaning apparatus 1, the crude space 6 is arranged in the interior of the filter body 2 and is thus surrounded by the filter body 2. In contrast with that, the filter body 2 is arranged in the clean space 7, so that the clean space 7 surrounds the filter body 2. The crude space 6 is connected to an inlet 8 on the crude end. Similarly, the clean space 7 is connected to an outlet 9 on the clean end.

The filter body 2 is thus designed so that its direction of filtration is oriented from the inside to the outside. The filter body 2 may be designed as an edge gap filter, for example. However, other suitable filter designs are also possible.

The cleaning apparatus 1 serves to remove solids from a liquid. This liquid is preferably a cooling lubricant, e.g., a cooling lubricant circuit of a machine for machining a workpiece. The cleaning apparatus 1 is then expediently used in such a cooling lubricant circuit to remove the expensive cooling lubricant from the solids necessarily entrained with it.

The cleaning apparatus 1 also comprises a backwashing device 10, with the help of which the filter body 2 can be backwashed segment by segment. In backwashing, the filter body 2 is acted upon by a backwashing flow opposite its direction of filtration, said flow then flowing through the filter body 2 from the outside to the inside. With the embodiments shown here, each backwashing device 10 comprises a backwashing nozzle 11 extending essentially over the entire axial length of the filter body 2. Then a circumferential segment of the filter body 2 may be acted upon by a backwashing flow with the help of the backwashing nozzle 11. For example, a backwashing gas such as compressed air or a liquid is suitable as the backwashing medium, so that the liquid cleaned with the help of the cleaning apparatus 1 is expediently used for this purpose.

The inventive cleaning apparatus 1 is also equipped with a discharge mechanism 12, with the help of which the cleaned solids can be removed from the crude space 6. According to this invention, this discharge mechanism 12 comprises a screw conveyor 13, which sends solids cleaned during operation of the cleaning apparatus 1 to a discharge opening 14. The cleaned solids can thus be removed from the crude space 6 through this discharge opening 14. This discharge opening 14 is arranged at a distance from the crude space 6 and leads out of the housing 3 in particular. This discharge opening 14 is thus accessible from the outside of the housing 3. The screw conveyor 13 conveys the solids out of the crude space 6, which is accessible per se, to the discharge opening 14, and thereby simplifies the removal of the solids from the crude space 6.

The inventive cleaning apparatus 1 is suitable in particular for a horizontal installation, in which the central longitudinal axis 4 of the filter body 2 is essentially horizontal and thus is essentially oriented across the direction of gravity, as in the exemplary embodiments shown here.

In the embodiments shown here, the filter body 2 is subdivided into at least three axial sections with regard to its longitudinal direction. A first axial end section 15 is facing away from or at a distance from the discharge opening 14 and is mounted rotatably on the housing 3. An axial filter section 16, which contains the actual filter structure and through which the flow can pass radially, follows this first end section 15 axially. A second end section 17, which faces and/or is arranged near the discharge opening 14, is connected axially to the filter section 16. The second end section 17 is also mounted rotatably on the housing 3.

The backwashing nozzle 11 expediently extends essentially over the entire axial length of the filter section 16 and in this way can act upon the filter section 16 with the backwashing flow from the outside, namely in the respective circumferential segment of the filter section 16 to be backwashed.

In the embodiments according to FIGS. 1 through 4 and 6 plus 7, the discharge apparatus 12 also includes a channel 18, which is arranged in the crude space 6, i.e., in the interior of the filter body 2. This channel 18 extends essentially across the entire axial length of the filter section 16. The channel 18 is expediently arranged radially opposite the backwashing nozzle 11, wherein the channel 18 and the backwashing nozzle 11 are expediently arranged essentially parallel to one another. The channel 18 is by definition provided with an open axial longitudinal side. The longitudinal opening formed in this way is labeled as 19 in FIG. 15. The channel 18 expediently has a profile which tapers in cross section from the longitudinal opening 19 to a base 20 of the channel 18 according to FIG. 15.

The channel 18 is thus open toward the top, opposite the direction of gravity, whereas the backwashing nozzle 11 backwashes downward, i.e., in the direction of gravity. This achieves the result that solids, which can be released from the inside wall of the filter body 2 in backwashing, can settle downward into the channel 18 due to the force of gravity. The channel 18 may thus collect most of the solids released from the filter body 2 with the help of the backwashing device 10. To this end, the channel 18 also extends essentially from the first end section 15 to approximately the second end section 17.

In the embodiments of FIGS. 1 through 4, the screw conveyor 13 has a screw shaft 21, which can be driven to rotate. The screw shaft 21 extends along the base 20 of the channel 18, expediently along the entire axial length of the channel 18. In this way, the screw shaft 21 can convey the solids collecting at the base 20 of the channel 18 in the direction of the discharge opening 14. In the preferred embodiments shown here, the discharge mechanism 12 may also be equipped with a pipe 22, which is connected directly to the channel 18 in the area of the second end section 17.

This pipe 22 leads to the discharge opening 14 and/or has the discharge opening 14. The screw shaft 21 also extends within the pipe 22, namely expediently up to the discharge opening 14 and/or into its vicinity. In this way, the screw shaft 21 conveys the solids collecting in the channel 18 through the pipe 22 to the discharge opening 14.

With the preferred embodiments shown here, the screw shaft 21 is also drive-coupled with the help of the drive unit 5, so that the drive unit 5 drives the screw shaft 21 as well as the filter body 2 to rotate. For example, the drive unit drives a drive shaft 23, which is connected in a rotationally fixed manner to the screw shaft 21 as well as to the filter body 2.

In the embodiment according to FIG. 1, the housing 3 is open axially. The cleaning apparatus 1 shown here is thus suitable for installation in a storage container for cleaned liquid, whereby the cleaning apparatus 1 is immersed essentially completely into the cleaned liquid.

In contrast with that, in the embodiments according to FIGS. 2 through 7, the housing 3 is closed, so that the cleaning apparatus 1 may essentially be installed at any location in a circuit of the liquid to be cleaned.

In the embodiments according to FIGS. 1 and 3, the cleaning apparatus 1 is assembled so that the axis of rotation and the central longitudinal axis 4 of the filter body 2 extends with a slight inclination with respect to a horizontal plane. This inclination amounts to less than 15°, for example, preferably less than 10° to the horizontal. This ensures that the solids can be discharged essentially in dry form from the discharge opening 14, which is then opened when the filtration operation is deactivated.

Figure 2:
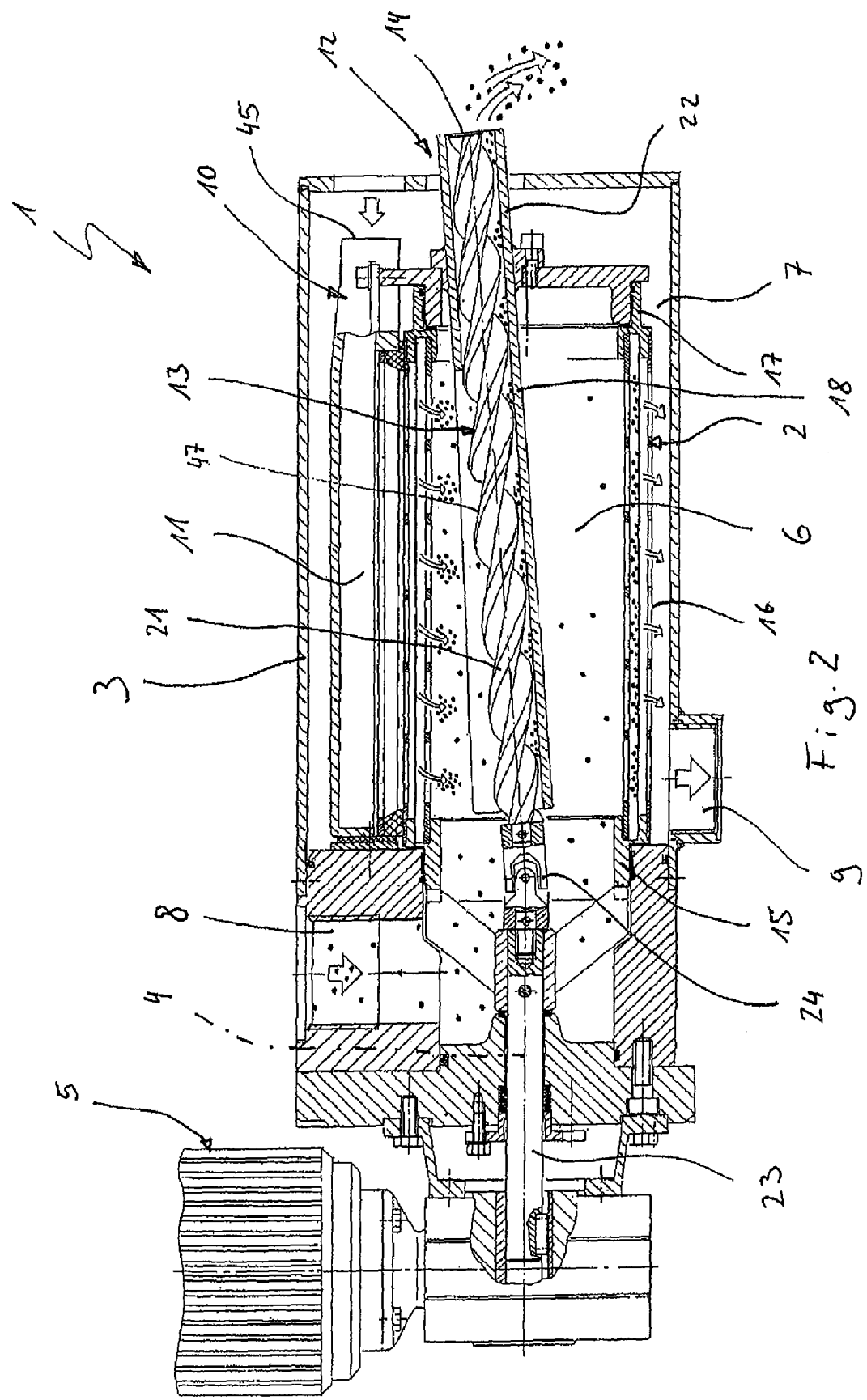

In the embodiments according to FIGS. 2 and 4, the cleaning apparatus 1 is arranged in such a way that the axis of rotation and the central longitudinal axis 4 of the filter body 2 extends essentially parallel to a horizontal plane. However, only the channel 18 runs at a slight inclination to this horizontal plane, e.g., up to max. 15°. Since the drive shaft 23 is arranged coaxially with the axis of rotation 4, the drive coupling between the drive shaft 23 and the screw shaft 21 surrounds a joint 24, which is designed as a cardan joint in particular.

The screw shaft 21 is mounted at one end via the drive shaft 4 and at the other end in the pipe 22. Additional bearing measures are unnecessary. According to a preferred embodiment, the screw shaft 21 may have a rotating brush, so that solids collecting in the channel 18 are brushed along the channel 18 toward the discharge opening 14 due to the rotation of the screw shaft 21.

According to FIGS. 3 and 4, the discharge opening 14 may be controlled with the help of a discharge valve 25. With the discharge valve 25 closed, the discharge opening 14 is sealed, so that leakage through the discharge opening 14 during operation of the cleaning apparatus 1 can be prevented. When the discharge valve 25 is opened, the discharge opening 14 is open, so that the solids can be removed through the discharge opening 14 and through the discharge valve 25. In this way, the excess pressure usually prevailing in the crude space 6 can be utilized advantageously, because when the discharge valve 25 is opened, a greater collection of solids formed at the discharge opening 14 due to continuous operation of the screw conveyor 13 can be discharged according to the pressure surge principle. This makes it possible to optimize the removal of the solids from the crude space 6. In the embodiments according to FIGS. 3 and 4, the pipe 22 contains an axial bearing 26. This axial bearing 26 allows axial equalization of length, which can be established due to thermally induced expansion effects. In addition, the axial bearing 26 simplifies assembly of the cleaning apparatus 1.

The cleaning apparatus 1 may also be equipped with a rinsing nozzle 27, which is arranged in the crude space 6, i.e., in the interior of the filter body 2, and can be acted upon by a rinsing stream with the help of a circumferential segment of the filter body 2 to rinse off the solids adhering thereto. As an example, such a rinsing nozzle 27 is shown in the embodiment depicted in FIG. 5, where it is clear that such a rinsing nozzle 27 may essentially be used with any of the embodiments depicted here to support the cleaning effect of the backwashing device 10.

The rinsing nozzle 27 preferably extends along the entire axial length of the filter section 16. The medium is used as the rinsing medium is expediently the same medium that also used as the backwashing medium, i.e., preferably liquid taken from the clean end. In the embodiments according to FIGS. 1 through 4, the channel 18 has an axially open end in the area of the first end section 15. The channel 18 in these embodiments is attached to the housing 3 by the pipe 22.

Figure 6:
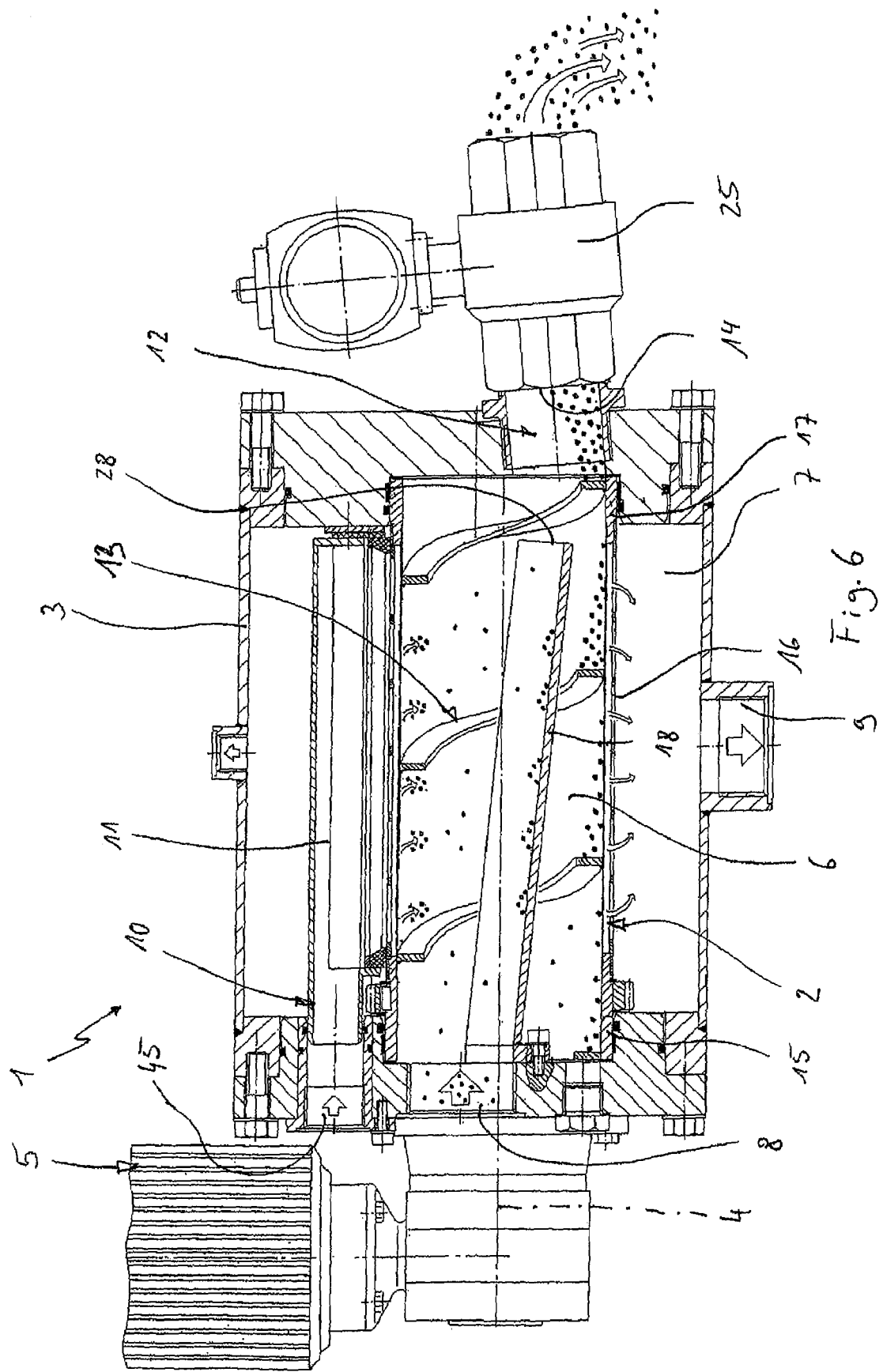
Figure 7:
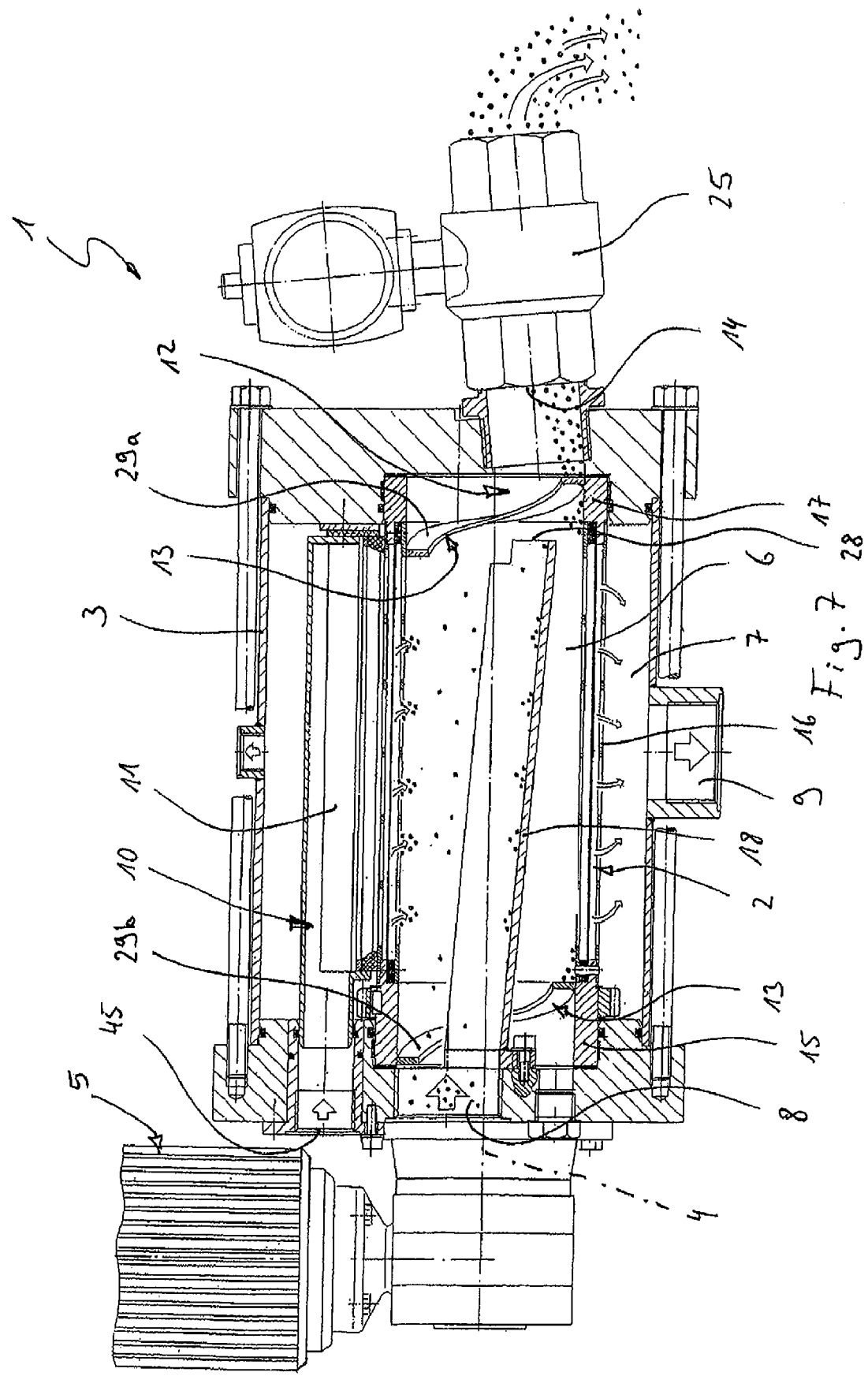

In contrast with that, in the embodiments according to FIGS. 6 and 7, the channel 18 is attached to the housing 3 in the area of the first end section 15. In these embodiments, the channel 18 extends from the first end section 15 to the second end section 17 and ends there in a free-standing form. The channel 18 has an axially open end 28 in the area of the second end section 17. In addition, in these embodiments the channel 18 is inclined with respect to the horizontal, so that solids which collect in the channel 18 automatically move due to gravity in the direction of the aforementioned free end 28, where they fall down from the channel 18 and strike the inside wall of the filter body 2. Due to the positioning of the free end 28 of the channel 18 in the area of the second end section 17, the solids removed from the channel 18 fall onto a section of the filter body 2 through which the flow cannot pass, namely the area of the inside wall of the filter body 2 assigned to the second end section 17.

In the embodiments according to FIGS. 5 through 7, the screw conveyor 13 has at least one helical web 29. This web is mounted on the inside of the filter body 2 and protrudes radially inward in profile. In the embodiments according to FIGS. 5 and 6, the web 29 extends essentially over the entire axial length of the filter section 16. The web 29 here coils in a helical or spiral coil pattern from the first end section 15 to the second end section 17. In the embodiments according to FIGS. 5 and 6, only a single web 29 is provided in each, extending continuously from the first end section 15 to the second end section 17. Due to the rotation of the filter body 2, the helical web 29 advances the screw feed and thereby forms the screw conveyor 13.

In the embodiment according to FIG. 7, two webs 29 are provided. The one web 29a extends only in the area of the second end section 17 and thus transports the solids conveyed from the channel 18 into the area of this second end section 17 in the direction of the discharge opening 14. In addition, another web 29b may be provided, extending only in the first end section 15, in which there is no cleaning due to backwashing. This second web 29b conveys solids that randomly enter this first end section 15 in the area of the filter section 16, where the solids enter the channel 18 in particular through backwashing. The solids collecting in the channel 18 are conveyed through it due to the gradient provided there to the second end section 17.

The screw conveyors 13 shown in the embodiments according to FIGS. 5 through 7 are more or less integrated into the filter body 2. In contrast with that, the screw conveyors in the embodiments of filter body 2 shown in FIGS. 1 through 4, form independent separate components. It is clear here that the principle of the screw conveyor 13 according to the embodiments of FIGS. 1 through 4 can be combined at will with the principle of the screw conveyor 13 according to the embodiments of FIGS. 5 through 7.

In the embodiments shown in FIGS. 1 through 4, the screw shaft 21 and/or its helical winding or simply the screw 47 cooperates with the base 20 of the channel 18 to supply the cleaned solids to the discharge opening 14. In contrast with that, in the embodiments according to FIGS. 8 through 14, no such channel 18 is provided; instead, the screw 47 of the screw shaft 21 is designed with dimensions in these embodiments, such that it cooperates with an inside wall 48 of the filter body 2 to supply the cleaned impurities to the discharge opening 14. The screw shaft 21 is arranged coaxially with the filter body 2, so that an outside cross section of the screw 47 corresponds approximately to an inside cross section of the inside wall 48. Screw 47 and inside wall 48 may be in contact with one another. In the embodiments shown in FIGS. 8 and 9, the screw shaft 21 is permanently drive-coupled to the drive shaft 23 like the filter body 2. When the drive unit 5 is operated, the filter body 2 and the screw shaft 21 are thus driven at the same rotational speed. Consequently, there is no relative movement between the screw 47 and the inside shaft 48 in these embodiments. Nevertheless, the screw conveyor 13 operates in the manner of an Archimedean screw and can supply the cleaned foreign substances to the discharge opening 14.

In contrast with that, a coupling device 49 is provided in each of the embodiments according to FIGS. 10 through 14. With the help of this coupling device 49, a drive coupling between the drive unit 5 and the filter body 2 can be activated and deactivated. In the example, the screw shaft 21 is thus permanently drive-coupled to the drive unit 5, whereas the filter body 2 can be switched on as needed with the help of the coupling device 49. Likewise, embodiments in which the filter body 2 is permanently driven and the screw shaft 21 can be activated are also known. Likewise, an embodiment in which the filter body 2 and the screw shaft 21 can be coupled to the drive unit 5 independently of one another is fundamentally also possible.

In the example, the drive shaft 23 is designed as a hollow shaft in which a switch rod 50 is mounted so it is axially displaceable. This switch rod 50 operates an driving element 51 in the form of a crossbar. In the active position shown here, the driving element 51 is engaged with the first end section 15 of the filter body 2 via a corresponding complementary driving element contour (not described in greater detail here). The driving element 51 thereby penetrates through the drive shaft 23 in a longitudinal slot 52 in which the driving element 51 is axially adjustable with the help of the switch rod 50. In the example shown here, the driving element 51 is pressed with the help of the switch rod 50 into the active position against the restoring force of a restoring spring (not shown in detail). Through adjustment of the switch rod 50 in the direction of the spring force of the restoring spring, the driving element 51 can be adjusted into a passive position in which it is released from said driving element contour, so that the form-fitting coupling between the driving element 51 and the filter body 2 is cancelled. Subsequently, only the screw shaft 21 is drive-connected to the drive unit 5, while the filter body 2 is driveless.

Figure 8:
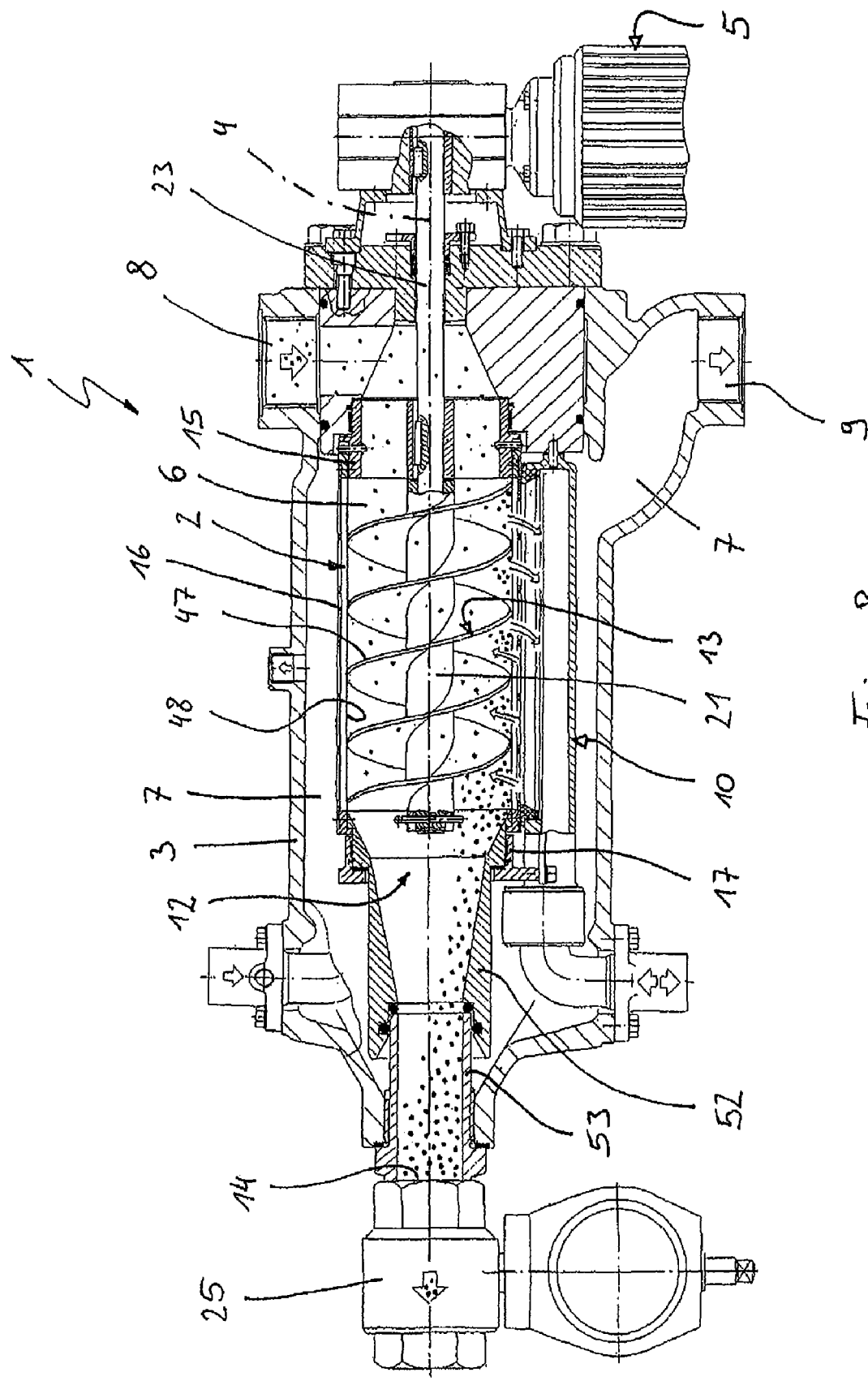
Figure 9:
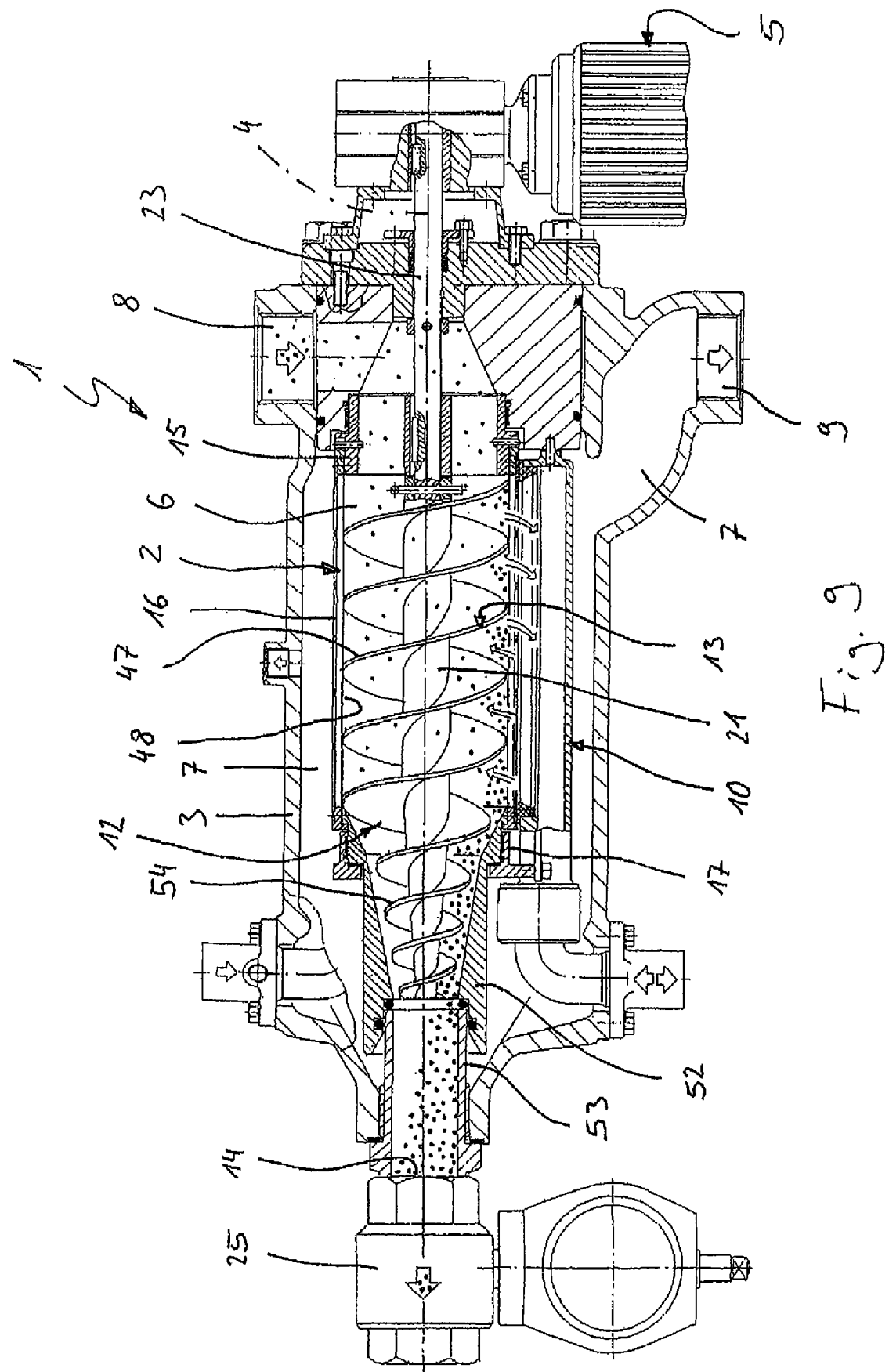
Figure 10:
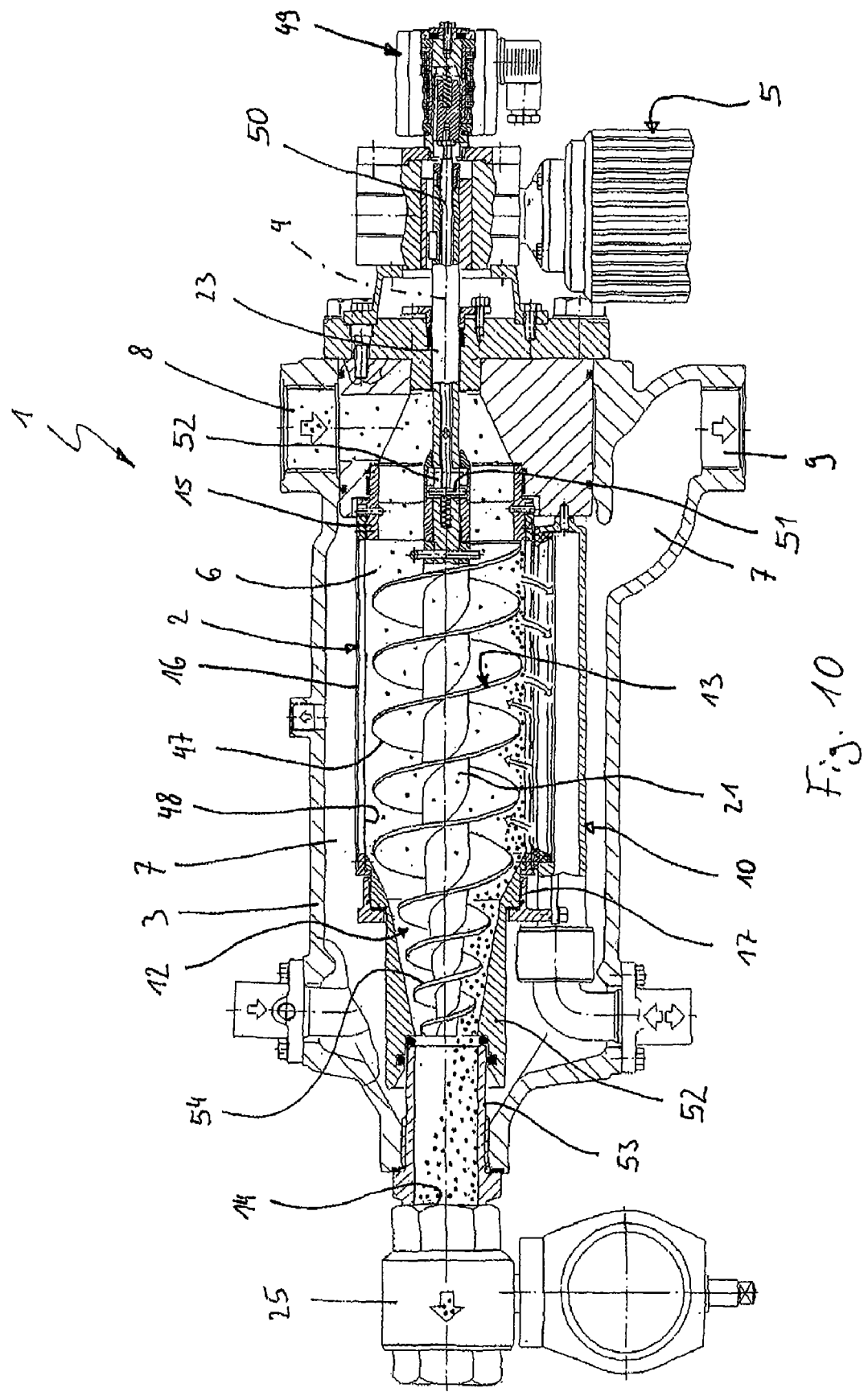

In the embodiment shown in FIG. 8, the screw shaft 21 extends approximately to the second end section 17. The screw 47 extends exclusively inside the filter section 16.

In the embodiments in FIGS. 9, 10, 12 and 14, the screw shaft 21 extends beyond the second end section 17, namely into a transitional section 52. In this transitional section 52, the filter body 2 has a transition in the axial direction on its second axial end section 17 facing the discharge opening 14. The transitional section 52 is shaped so that the crude space 6 therein widens in a conical or funnel shape with an increase in distance from the discharge opening 14. The transitional section 52 here creates a transition between the cylindrical filter body 2 and a cylindrical pipe section 53, which is connected to the discharge opening 14 and has a smaller cross section than the filter body 2.

In the embodiments according to FIGS. 9, 10, 12 and 14, the screw shaft 21 ends in the transitional section 52. The screw 47 in these embodiments is equipped with a conical screw section 54, which extends within the transitional section 52 and has a complementary shape, i.e., the conical screw section 54 tapers in the direction of the discharge opening 14.

Figure 11:
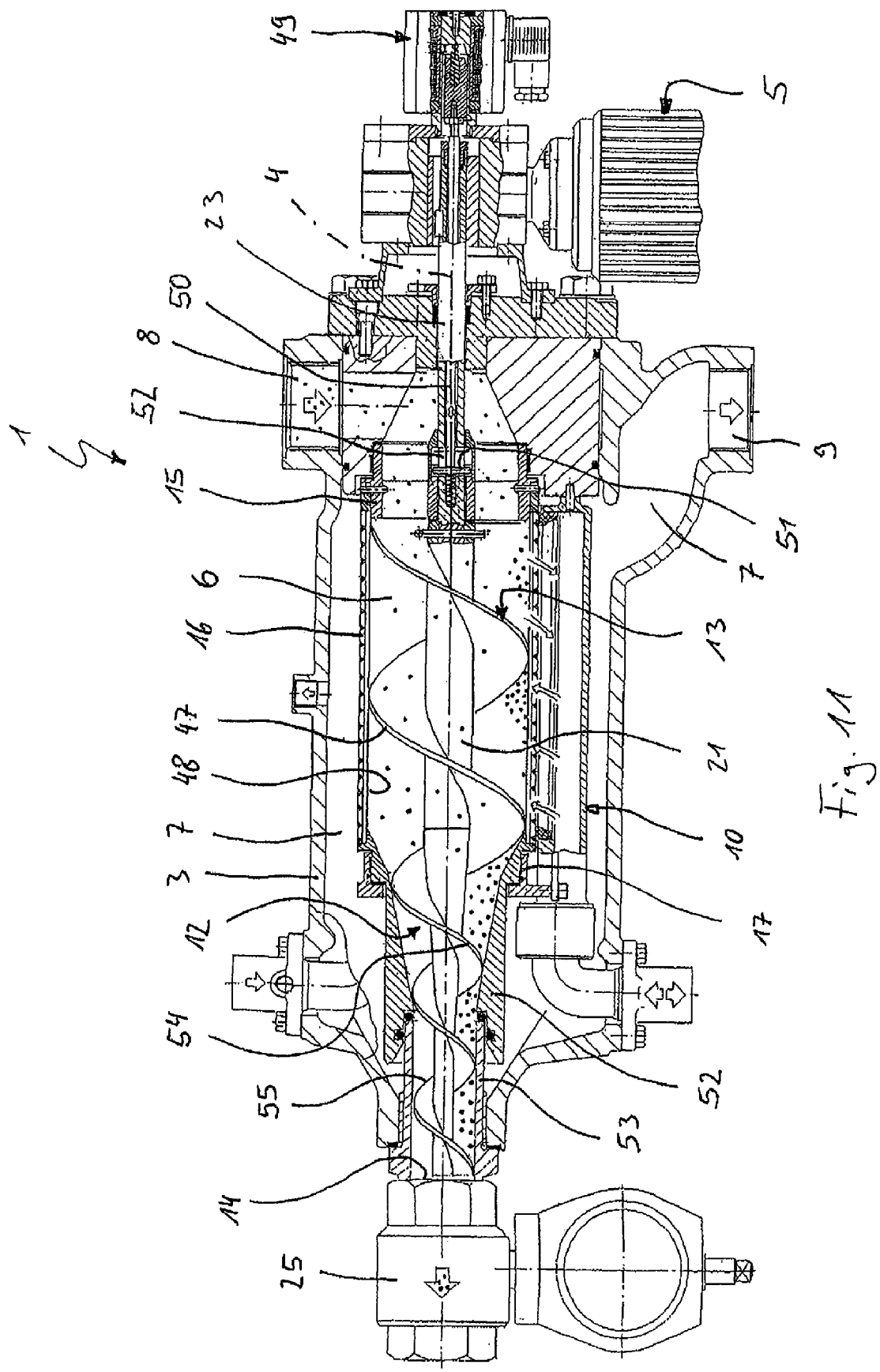

In the embodiments according to FIGS. 11 and 13, the screw shaft 21 and screw 47 also extend into the transitional section 52. In addition, in these embodiments the screw shaft 21 and the screw 47 also extend into the pipe section 53, preferably up to directly at the discharge opening 14. The screw 47 is therefore equipped with a cylindrical screw section 55, which is complementary to the pipe section 53. In the embodiments according to FIGS. 9 through 14, the screw shaft 21 must also be designed to be conical, at least in the transitional area 52. In the embodiment shown in FIG. 11 in particular, in which relative movements between the screw 47 and the inside wall 48 are possible through deactivation of the drive coupling between the drive unit 5 and the filter body 2, the screw 47 may be equipped with a scraper (not shown) on its outer edge (not shown in detail), which cooperates with the inside wall 48. This scraper can compensate for manufacturing tolerances and positional tolerances, can prevent damage to the inside wall 48 and/or the screw 47 and can achieve an effective seal between the screw 47 and the inside wall 48, thereby improving the conveyance effect of the screw conveyor 13.

In the embodiments according to FIGS. 1 through 4 and 8 through 11 as well as 13 and 14, the screw 47 is made of a relatively rigid material, in particular sheet metal or plastic, but in another embodiment according to FIG. 12, the screw 47 is formed by flexible bristles 56. The screw shaft 21 thus carries a screw-shaped brush. In addition to the conveying effect, this screw 47 has an improved cleaning effect because it additionally brushes the inside wall 48 with its bristles 56 in relative movements between the screw 47 and the inside wall 48.

According to FIGS. 13 and 17, the screw 47 may be equipped with a scraper arrangement 57. For example, the scraper arrangement 57 includes three scrapers 58, which are distributed in the circumferential direction and cooperate with the inside wall 48 to scrape off the impurities adhering thereto if there is a relative rotation between the screw shaft 21 and the filter body 2. The scrapers 58 are attached to rod-shaped scraper carriers 59, which are in turn attached to the screw 47.

In the embodiment shown in FIGS. 14 and 18, the screw 47 is equipped with a brush arrangement 60, which has several round brushes 61 distributed in the circumferential direction on the screw 47. The brush arrangement 60 also serves to clean the inside wall 48 in the case of relative movements between the filter body 2 and the screw shaft 21 and/or between the inside wall 48 and the respective round brush 61.

According to FIGS. 15 and 16, the filter body 2 expediently has a supporting structure 30, which carries the actual filter material 31. As already explained above, this filter material 31 may essentially have any suitable construction and/or properties. However, the filter material 31 is preferably a tightly coiled profiled wire to embody the filter body 2 as an edge gap filter.

The supporting structure 30 is segmented in the circumferential direction with the help of a plurality of radial webs 32, but flow can pass radially through all segments 33. However, an exchange of liquid between neighboring segments 33 in the circumferential direction is impossible due to the webs 32. The backwashing nozzle 11 operates segment by segment, i.e., the backwashing nozzle 11 always rinses only a single circumferential segment 33. In this way, the effect of the backwashing flow can be concentrated on the respective segment 33, which in turn improves the cleaning effect and, on the other hand, reduces the volume flow of backwashing medium.

FIG. 16 also shows that the rinsing nozzle 27 may be positioned with respect to the inside wall of the filter body 2, so that the rinsing stream created forms an acute angle with respect to the inside wall of the filter body 2 against which the flow is directed. This yields a scraping effect in the manner of a scraper. The rinsing nozzle 27 and/or the backwashing nozzle 11 may preferably be designed as high-pressure nozzles, so that the backwashing medium is driven with a high pressure against the outside wall of the filter body 2 and/or the rinsing medium is driven in a high pressure against the inside wall of the filter body 2.

As FIGS. 17 and 18 show, additionally or alternatively, a cleaning nozzle 62 may be provided in the clean space 7, its point-shaped or linear cleaning jet being directed at the filter body 2 from the outside.

FIGS. 19 through 24 show different exemplary installation situations for the cleaning apparatus 1. Accordingly, the outlet 9 is connected to an outlet line 63 in the installed state. The inlet 8 is connected to an inlet line 64 and the discharge opening 14 is connected via the discharge valve 25 to a discharge line 65. In addition, a pump 66, which is driven by a motor 67, is also provided. In the embodiments according to FIGS. 19 through 21, a backwashing line 68 is also connected to the backwashing device 10.

Figure 19:
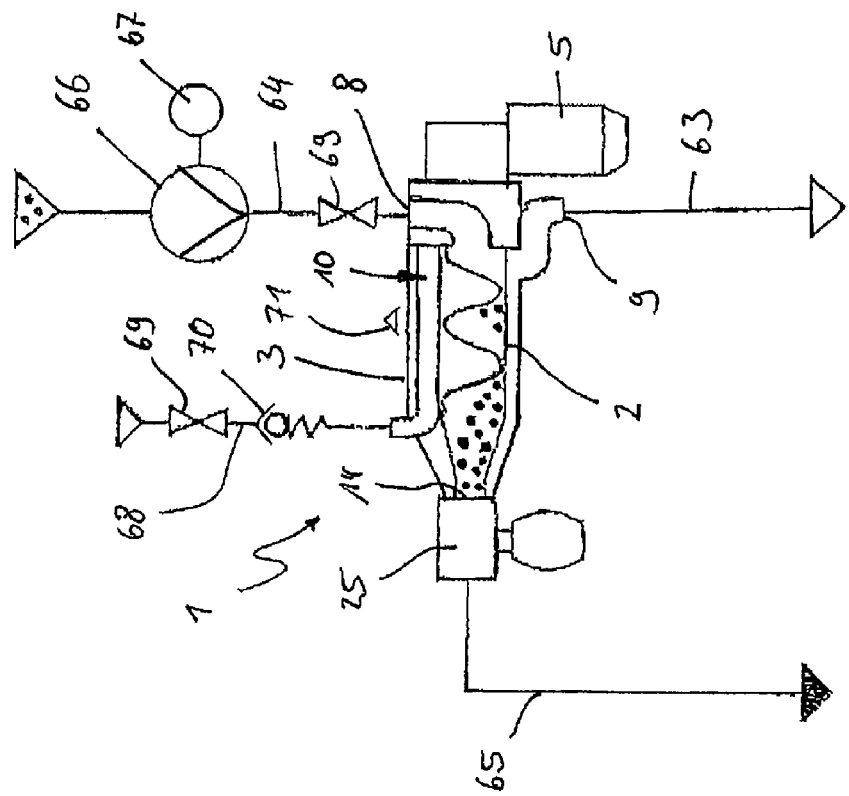

In the embodiment shown in FIG. 19, the pump 66 is arranged in the inlet line 64, namely upstream from a switchable cutoff valve 69. The backwashing line 68 also contains a switchable cutoff valve 69 and additionally contains a non-return cutoff valve 70. In filtration operation, the pump 66 conveys the contaminated liquid through the cleaning apparatus 1. At the same time, a backwashing medium which may be a liquid or a gas, in particular air, can be supplied via the backwashing device 10 for cleaning the filter body 2. To empty the cleaning apparatus 1, the pump 66 may be turned off and the cutoff valve 69, which is arranged downstream from it may be closed. A gas, preferably air, in particular compressed air, may be supplied via the backwashing line 68, so that all the liquid can be driven out of the cleaning apparatus 1 through the outlet 9. To be able to drain the gas filling out of the cleaning apparatus 1 in a subsequent filtration operation, the housing 3 may be equipped with a corresponding ventilating valve 71.

Figure 20:
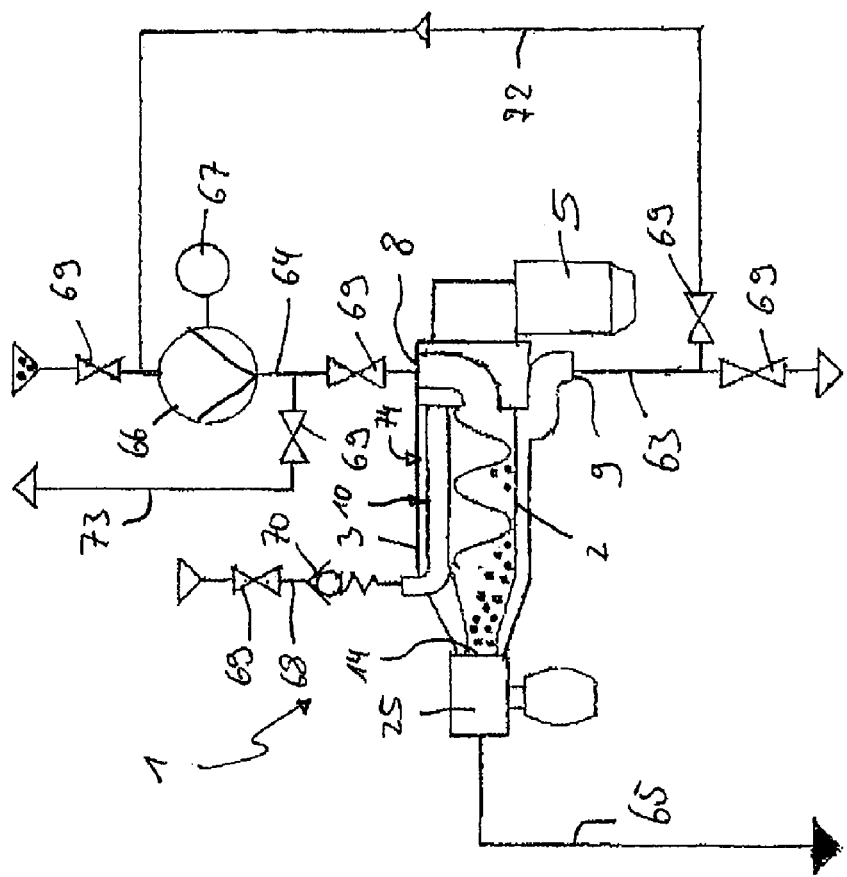

The embodiment shown in FIG. 20 differs from the embodiment shown in FIG. 19 in the suction line 72 and an exhaust line 73 as well as switchable cutoff valves 69. The suction line is connected to the outlet line 63 upstream from a cutoff valve 69 arranged therein and is connected to the inlet line 64 upstream from the pump 66. The exhaust line 73 is connected to the inlet line 64 downstream from the pump 66 and upstream from a cutoff valve 69 arranged therein. The suction line 72 and the exhaust line 73 both contain a cutoff valve 69.

In filtration operation, the cutoff valves 69 of the suction line 72 and the exhaust line 73 are closed, so that the pump 66 conveys the liquid to be filtered through the cleaning apparatus 1. In suction operation, the cutoff valves 69 that are situated in the inlet line 64 and the outlet line 63 are closed, while the cutoff valves 69 of the suction line 72 and the exhaust line 73 are opened. Then the pump 66 draws liquid out of the cleaning apparatus at its outlet 9 and conveys this liquid through the suction line 72 and the exhaust line 73 away from the cleaning apparatus 1. At the same time, air or another gas can be resupplied through the backwashing line 68 or through an aeration valve 74.

Figure 21:
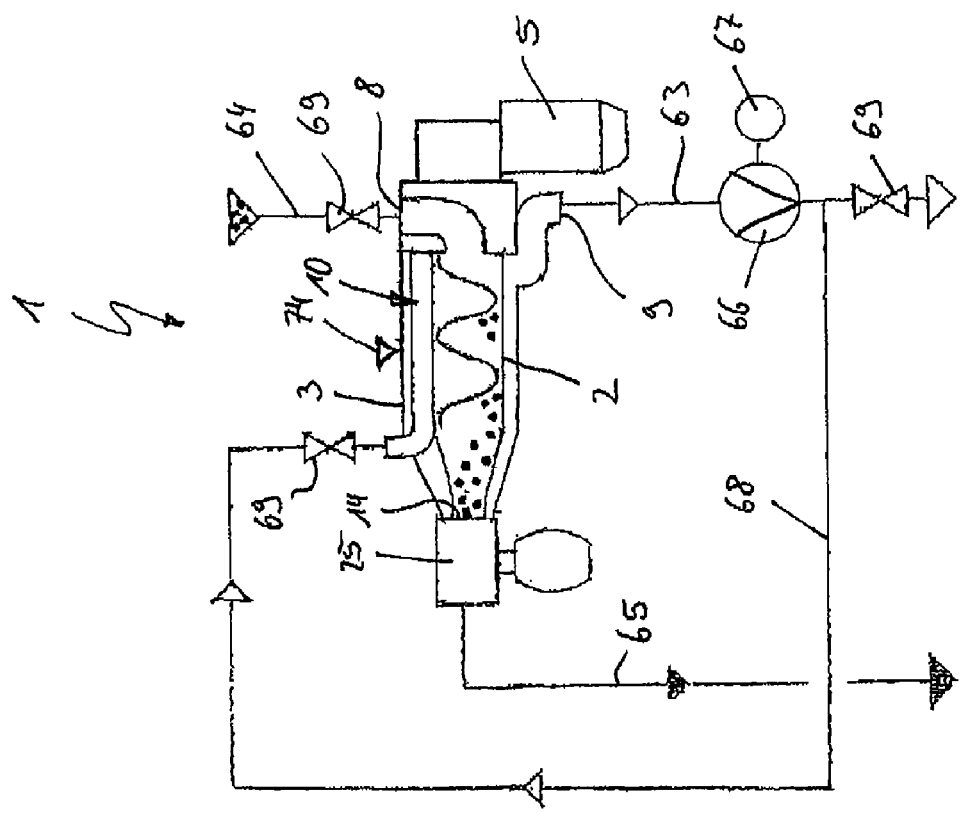

In the embodiment shown in FIG. 21, the pump 66 is arranged in the outlet line 63. In addition, the backwashing line 68 is connected to the outlet line 63 downstream from the pump 66 and upstream from the cutoff valve 69 arranged in the outlet line 63. In filtration operation, the pump 66 draws the medium to be filtered through the cleaning apparatus 1. At the same time, a substream of the cleaned medium can be utilized for backwashing the filter body 2 via the backwashing line 68. To empty the cleaning apparatus 1, the cutoff valve 69 arranged in the inlet line 64 is closed, so that the pump 66 sucks the cleaning apparatus 1 empty. Air or gas can be resupplied accordingly through an aeration valve 74.

Figure 22:
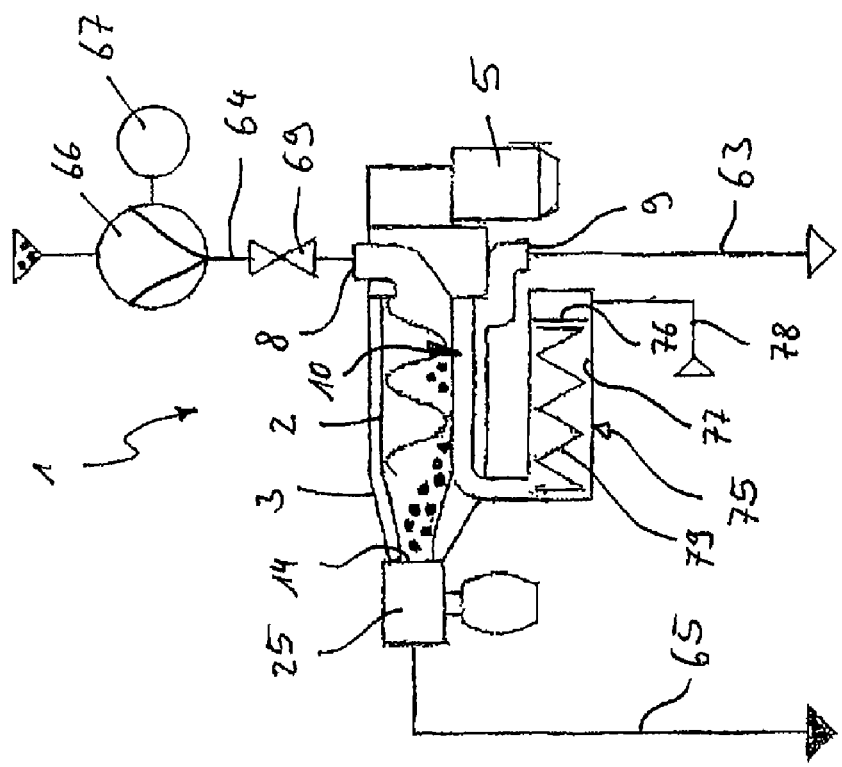
Figure 23:
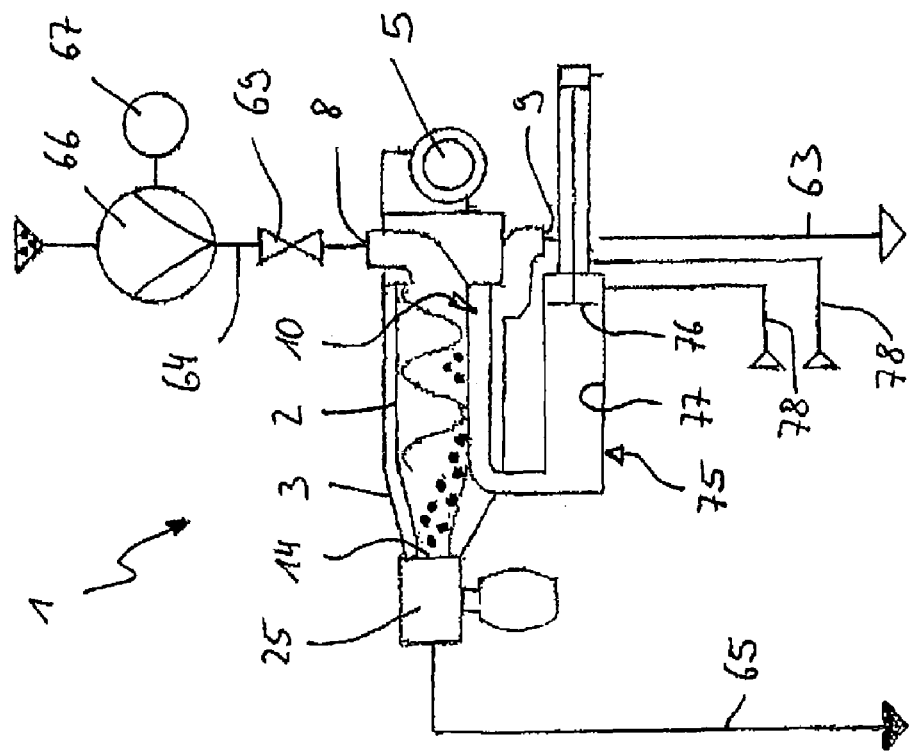

In the embodiments according to FIGS. 22 through 24, the pump 66 is arranged in the inlet line 64, namely upstream from a cutoff valve 69, which is also arranged in the inlet line 64. In these embodiments, a pressure generator 75 is connected to the backwashing device 10 at the inlet end. This pressure generator 75 is designed so that a backwashing pressure flow of a rinsing medium can be generated with it, with the help of which backwashing of the filter body 2 segment by segment is implemented. This pressure generator 75 is operated periodically to thereby act upon segment 33 for segment 33 with the pressure flow. A pressure flow here is understood to refer to a flow which acts upon the filter body 2 with a relatively high pressure. A comparatively small volume of rinse medium may be sufficient here to achieve an effective cleaning effect by backwashing. With brief pressure flows, it is also possible to speak of pressure pulses or pulse-like backwashing.

The pressure generator 75 may also preferably be designed so that it can be operated as a vacuum generator. During operation as a vacuum generator, the pressure generator 75 generates via the backwashing device 10 a flushing suction flow which has a direction of flow opposite the backwashing pressure flow. Via the suction flow, it is possible to remove by suction the impurities which have been deposited on the clean end 7 of the filter body 2 in the area of the backwashing device 10. FIGS. 8 through 14 show the pressure flow, represented by arrows pointing into the crude space 6, and the suction flow, represented by arrows pointing out of the crude space 6.

In the embodiments shown here, the pressure generator 75 is preferably designed as a piston-cylinder unit and thus comprises a piston 76, which is arranged in a cylinder 77 with an adjustable stroke. In the embodiment shown in FIG. 22, the pressure generator 75 can be driven pneumatically or hydraulically via a control line 78 to execute a forward stroke in which the pressure generator 75 generates the backwashing pressure flow. To perform a reverse stroke, the cylinder 77 contains a restoring spring 79 that drives the piston 76 in the opposite direction. The reverse stroke may generate a flushing suction flow, for example.

In the embodiment shown in FIG. 23, two control lines 78 are connected to the pressure generator 75. The piston 76 is driven hydraulically or pneumatically via a control line to perform the forward stroke, while it is driven pneumatically or hydraulically via the control line 78 to perform the reverse stroke.

In the embodiment shown in FIG. 24, the pressure generator 75 is drive-coupled to the drive unit 5, which also serves to drive the filter body 2 and/or the screw shaft 21. The drive coupling is accomplished, for example, via a drive belt 80 or a chain or by gear teeth. The drive of the piston 76 may be accomplished, for example, with the help of a spindle drive (not shown in detail here).

According to FIG. 25, an inventive cleaning system 34 comprises at least two cleaning apparatuses 1, which may preferably be designed according to this invention, but essentially may also be of a conventional type. The cleaning system 34 is integrated into a liquid circuit 35, which is represented here by arrows. This liquid circuit 35 is preferably a cooling lubricant circuit 35. The cleaning system 34 receives liquid contaminated with solids via a return flow 36 of the liquid circuit 35. To this end, the liquid circuit 35 is connected to a common inlet connection 37 of the cleaning system 34. The liquid from which the solids have been removed exits through a common outlet connection 38 to which a recipient 39 of the liquid circuit 35 is connected.

The common inlet connection 37 branches off to the two inlets 8 of the two cleaning apparatuses 1. Likewise, the common outlet connection 38 branches off to the two outlets 9 of the two cleaning apparatuses 1. Accordingly, the two cleaning apparatuses 1 are connected in parallel to the liquid circuit 35 within the cleaning system 34.

The cleaning system 34 has an inlet valve arrangement 40, which in the present case is formed by two separately controllable inlet valves 41 and 42, the one inlet valve 41 controlling the inlet 8 of the one cleaning apparatus 1, while the other inlet valve 42 controls the inlet 8 of the other cleaning apparatus 1. In this way, the inlet valve arrangement 40 can separate the one or the other cleaning apparatus 1 from the liquid circuit 35.

The cleaning system 34 is expediently operated in such a way that filtration can be performed continuously. Accordingly, with both cleaning apparatuses 1, filtration operation can be activated and deactivated in alternation. When filtration operation is deactivated, the respective inlet valve 41, 42 is blocked, so that the pressure in the crude space 6 drops. The discharge opening 14 and/or the respective discharge valve 25 may be opened accordingly. The screw conveyor 13 is still in operation and can convey the cleaned solids essentially in dry form out of the housing 3 of the respective cleaning apparatus 1. With the cleaning apparatus 1, whose filtration operation is deactivated, the backwashing device 10 is expediently still in operation, as it was before, which allows complete cleaning of the filter body 2.

With the preferred embodiment shown here, the cleaning system 34 has a common supply line 43, which has a common supply connection 44 and with each cleaning apparatus 1 leads to a connection 45 by means of which the backwashing device 10 of the respective cleaning apparatus 1 can be supplied with the respective backwashing medium. Accordingly, the common supply connection 44 is connected to a common backwashing medium supply. The backwashing devices 10 of the two cleaning apparatuses 1 may thus be continuously active even when filtration operation is alternately activated and deactivated with the two cleaning apparatuses 1. This greatly simplifies the control for operation of the cleaning system 34.

According to a preferred embodiment, as already mentioned above, the backwashing medium may expediently be formed by the cleaned liquid of the liquid circuit 35. Accordingly, the supply line 43 is connected to the clean end of the cleaning system 34 via its supply connection 44. This connection is preferably internal, i.e., inside the cleaning system 34, which saves on line routing. This connection is indicated by an interrupted line in FIG. 25 and is labeled as 46.

The invention claimed is:

1. A cleaning apparatus for removing solids from a liquid, the cleaning apparatus comprising:
   an essentially horizontally arranged hollow cylindrical filter body separating a crude space from a clean space, the filter body surrounding the crude space and the clean space surrounding the filter body, the clean space acted upon by a pressure during a filtration operation;
   an inlet fluidly connected to the crude space;
   an outlet fluidly connected to the clean space;
   a backwashing device for cleaning solids from the filter body;
   a discharge mechanism for removing the cleaned solids from the crude space, the discharge mechanism including a screw conveyor for transporting the cleaned solids to a discharge opening; and
   a discharge valve for controlling the discharge opening.

2. The cleaning apparatus of claim 1 further comprising a drive unit drive-coupled to the filter body for rotating the filter body about a central longitudinal axis of the filter body, wherein the screw conveyor includes at least one inwardly protruding coiled web attached to an inside of the filter body.

3. The cleaning apparatus of claim 2, wherein the filter body comprises a filter section through which a flow can pass radially, the at least one web extending essentially over the entire length of the filter section.

4. The cleaning apparatus of claim 2, wherein the filter body comprises a filter section through which a flow can pass radially and a first end section positioned adjacent the discharge opening and connected axially to the filter section, and further wherein at least one of the at least one web is arranged exclusively in the end section.

5. The cleaning apparatus of claim 4, wherein the filter body further comprises a second end section connected axially to the filter section opposite the first end section, and further wherein at least one of the at least one web is arranged exclusively in the second end section.

6. The cleaning apparatus of claim 1, wherein the filter body comprises a filter section through which a flow can pass radially, the cleaning apparatus further comprising a channel that extends essentially over an entire axial length of the filter section.

7. The cleaning apparatus of claim 6, wherein the backwashing device includes a backwashing nozzle arranged in the clean space and extending essentially over the entire axial length of the filter section, the backwashing nozzle acting upon a circumferential segment of the filter section with a backwashing flow for backwashing, the channel arranged radially opposite the backwashing nozzle.

8. The cleaning apparatus of claim 6, wherein the filter body further comprises a first end section connected axially to the filter section and facing away from the discharge opening, and a second end section connected axially to the filter section and facing the discharge opening, the channel extending from the first end section to at least the second end section.

9. The cleaning apparatus of claim 8, wherein the channel includes an axially open end in the area of the second end section.

10. The cleaning apparatus of claim 6, wherein the screw conveyer includes a screw shaft that can be driven to rotate and extends along a base of the channel.

11. The cleaning apparatus of claim 10, wherein the filter body further comprises an end section facing the discharge opening and connected axially to the filter section, the channel developing into a pipe leading to the discharge opening in the area of the end section of the filter body and the screw shaft extends through the pipe up to the discharge opening.

12. The cleaning apparatus of claim 1, wherein the screw conveyor comprises:
   a screw shaft that is driven to rotate; and
   a screw operably connected to the screw shaft, the screw cooperating with an inside wall of the filter body.

13. The cleaning apparatus of claim 12, wherein the filter body includes an axial end section facing the discharge opening, the axial end section developing axially into a transitional section in which the crude space widens conically with an increase in the distance from the discharge opening, the screw shaft extending into the transitional section, the screw including a conical screw section that is complementary to the transitional section.

14. The cleaning apparatus according to claim 13, wherein the transitional section develops axially into a cylindrical end section connected to the discharge opening, the screw shaft extending into the cylindrical end section and the screw including a cylindrical screw section that is complementary to the cylindrical end section.

15. The cleaning apparatus of claim 12, further comprising at least one of a brush arranged on the screw for brushing off the inside wall of the filter body and a scraper arranged on the screw for scrapping off the inside wall of the filter body.

16. The cleaning apparatus of claim 12, wherein the screw shaft and the filter body are drive-coupled to a common drive unit.

17. The cleaning apparatus of claim 16, further comprising a coupling device for selectively activating and deactivating a coupling between the drive unit and at least one of the filter body and the screw shaft.

18. The cleaning apparatus of claim 12, wherein the screw includes flexible bristles.

19. The cleaning apparatus of claim 1, wherein the discharge valve is operable to close the discharge opening.

20. The cleaning apparatus of claim 1, further comprising a rinsing nozzle disposed in the crude space, the rinsing nozzle operable to discharge a rinsing flow for rinsing off a circumferential segment of the filter body.

21. The cleaning apparatus of claim 1, further comprising:
an outlet line connected to the outlet;
an inlet line connected to the inlet;
a pump arranged in the inlet line;
a suction line connected to the outlet line and the inlet line upstream from the pump;
an exhaust line connected to the inlet line downstream from the pump; and
a switchable cutoff valve arranged in each of the outlet line, the inlet line, the exhaust line, and the suction line, such that the pump can draw liquid off at the outlet in suction operation and can remove the liquid via the suction line and the exhaust line.

22. The cleaning apparatus according to claim 1, further comprising:
an inlet line connected to the inlet;
a switchable cutoff valve arranged in the inlet line, the cutoff valve operable to close the inlet line to enable liquid to be expelled from the outlet by injecting a gas through the backwashing device.

23. The cleaning apparatus according to claim 1, further comprising a pressure generator for generating a pressurized flow of a backwashing rinsing medium, the pressure generator connected to an inlet end of the backwashing device.

24. The cleaning apparatus of claim 23, wherein the pressure generator includes a piston-cylinder unit operable for performing a forward stroke and a return stroke, the forward stroke of the piston-cylinder unit is at least one of pneumatically driven and hydraulically driven, the pressure generator further comprising a restoring spring for executing the return stroke of the piston-cylinder.

25. The cleaning apparatus of claim 23, wherein the pressure generator includes a piston-cylinder unit operable for performing a forward stroke and a return stroke, the forward and return strokes of the piston-cylinder unit are at least one of pneumatically driven and hydraulically driven.

26. The cleaning apparatus of claim 23, wherein the pressure generator includes a piston-cylinder unit, the cleaning apparatus further comprising a common drive unit drive-coupled to the piston-cylinder unit and the filter body.

27. The cleaning apparatus of claim 23, wherein the pressure generator is configured as a piston-cylinder unit, the cleaning apparatus further comprising a spindle drive for driving the piston-cylinder unit.

28. The cleaning apparatus of claim 23, wherein the pressure generator is operable as a vacuum generator for generating a rinsing suction flow.

29. A cleaning system for removing solids from a liquid, the cleaning system comprising:
at least two cleaning apparatuses, each cleaning apparatus comprising:
an essentially horizontally arranged hollow cylindrical filter body separating a crude space from a clean space, the filter body surrounding the crude space and the clean space surrounding the filter body, the clean space acted upon by a pressure during a filtration operation;
an inlet fluidly connected to the crude space;
an outlet fluidly connected to the clean space;
a backwashing device for cleaning solids from the filter body;
a discharge mechanism for removing the cleaned solids from the crude space, the discharge mechanism including a screw conveyor for transporting the cleaned solids to a discharge opening; and
a discharge valve for controlling the discharge opening;
wherein the at least two cleaning apparatuses are connected in parallel to a fluid circuit that for conveying the liquid, the cleaning system further comprising an inlet valve connected to the inlet of at least one of the at least two cleaning apparatus, the inlet valve operable to separate the inlet from the fluid circuit.

30. The cleaning system of claim 29, wherein each of the at least two cleaning apparatuses includes a fluid connection for supplying a backwashing medium to the backwashing device of the respective cleaning apparatus, the fluid connections are connected to a common supply line for supplying the backwashing medium.

31. The cleaning system of claim 30, wherein the supply line is in fluid communication with the outlet of the at least two cleaning apparatuses.

* * * * *